United States Patent
Rashid et al.

(10) Patent No.: US 12,384,918 B2
(45) Date of Patent: Aug. 12, 2025

(54) BINDER MATERIALS

(71) Applicant: Materialize.X Limited, London (GB)

(72) Inventors: Haidin Farmin Rashid, London (GB); Adrien Stephane Hitz, London (GB); Sanjeev Gajjela, London (GB)

(73) Assignee: Materialize.X Limited, London (GB)

( * ) Notice: Subject to any disclaimer, the term of this patent is extended or adjusted under 35 U.S.C. 154(b) by 814 days.

(21) Appl. No.: 17/296,074

(22) PCT Filed: Nov. 21, 2019

(86) PCT No.: PCT/GB2019/053302
§ 371 (c)(1),
(2) Date: May 21, 2021

(87) PCT Pub. No.: WO2020/104811
PCT Pub. Date: May 28, 2020

(65) Prior Publication Data
US 2022/0010138 A1    Jan. 13, 2022

(30) Foreign Application Priority Data

Nov. 21, 2018 (GB) .................................. 1818985

(51) Int. Cl.
*C08L 97/02*    (2006.01)
*B27N 3/00*    (2006.01)
(Continued)

(52) U.S. Cl.
CPC .............. *C08L 97/02* (2013.01); *B27N 3/002* (2013.01); *C09D 197/02* (2013.01); *C09J 5/00* (2013.01);
(Continued)

(58) Field of Classification Search
CPC ... C08L 97/02; C08L 2205/035; B27N 3/002; C09D 197/02; C09J 5/00; C09J 199/00;
(Continued)

(56) References Cited

U.S. PATENT DOCUMENTS

| | | | |
|---|---|---|---|
| 4,076,846 A * | 2/1978 | Nakatsuka | A23P 30/00 |
| | | | 426/138 |
| 5,968,811 A | 10/1999 | Greenshields et al. | |
| 2005/0215153 A1 | 9/2005 | Cossement et al. | |

FOREIGN PATENT DOCUMENTS

| | | |
|---|---|---|
| CN | 103254842 B | 7/2015 |
| EP | 0230378 A2 | 7/1987 |

(Continued)

OTHER PUBLICATIONS

Sweta Rajkumar, Office Action on Applicant's IN Patent App. No. 201917050458, Jul. 27, 2021, IPO, Delhi IN.
(Continued)

*Primary Examiner* — Ling Siu Choi
*Assistant Examiner* — Andrea Wu
(74) *Attorney, Agent, or Firm* — Kearney, McWilliams & Davis; Erik J. Osterrieder

(57) ABSTRACT

The invention provides a method for preparing a binder precursor, the method comprising the steps of: i) mixing (A) fungi or glucan and (B) starch with an alkaline agent in the presence of an aqueous solvent system to form an alkaline composition; ii) mixing the alkaline composition with an acidic agent to form a mixture; and iii) drying the mixture and forming a powder therefrom, so as to form a powdered binder precursor.

24 Claims, 3 Drawing Sheets

(51) Int. Cl.
    *C09D 197/02*     (2006.01)
    *C09J 5/00*     (2006.01)
    *C09J 199/00*     (2006.01)

(52) U.S. Cl.
    CPC ....... *C09J 199/00* (2013.01); *C08L 2205/035* (2013.01); *C09J 2400/306* (2013.01); *C09J 2403/00* (2013.01); *C09J 2405/00* (2013.01); *C09J 2499/00* (2013.01)

(58) Field of Classification Search
    CPC .............. C09J 2400/306; C09J 2403/00; C09J 2405/00; C09J 2499/00
    See application file for complete search history.

(56) References Cited

FOREIGN PATENT DOCUMENTS

| | | | | |
|---|---|---|---|---|
| GB | 2185489 A | | 7/1987 | |
| WO | WO-9605254 A1 | * | 2/1996 | ............ B01F 23/511 |
| WO | WO-2015196134 A1 | * | 12/2015 | ......... C08G 18/6484 |
| WO | 2018215742 A | | 11/2018 | |

OTHER PUBLICATIONS

Jason Scott, UKIPO Patents Act 1977: Search Report under Section 17(5), Aug. 22, 2019, UKIPO, Newport, GB.
Eleonora Vaccaro, International Search Report & Written Opinion, Feb. 27, 2020, WIPO, Rijswijk, NL.

* cited by examiner

BINDER MATERIALS

REFERENCE TO RELATED APPLICATIONS

This is a national entry application from and that claims priority to PCT application PCT/GB2019/053302 filed Nov. 21, 2019, which claims priority to GB provisional application number 1818985.2 filed Nov. 21, 2018, and that are incorporated hereby in their entireties.

FIELD OF THE INVENTION

This invention relates to binder precursors, rehydrated binders and articles formed from such binder precursors and/or rehydrated binders. The binder precursors and rehydrated binders are based on fungi or glucan, i.e., one or both of fungi and glucan are used as starting materials, together with starch, e.g., dextrin. The invention provides methods to produce three-dimensional shaped articles from these binder precursors and/or rehydrated binders, as well as methods to produce certain such binder precursors and/or rehydrated binders, and methods to form three-dimensional composite products where component parts are secured together by certain such binder precursors and/or rehydrated binders. The shaped articles, composite products, binder precursors, and rehydrated binders can be sustainably sourced and are non-toxic. The shaped articles and composite products have excellent strength characteristics.

BACKGROUND

Engineered wood products are frequently used in the construction industry. These products are made from pieces of wood that are secured together using adhesives and/or binders to produce a composite wood product. Different types of engineered wood products can be manufactured from different wood-based feedstocks, such as strands, fibres, chips or thin layers (plies). Common engineered wood products include particle board, fibreboard, and plywood, e.g., medium-density fibreboard (MDF). Engineered wood products can vary in their structural and/or non-structural properties, and find a variety of uses such as in furniture and construction.

The engineered wood industry has become more sustainable and efficient over time, for example by using wood from replanted forests as a raw material and increasing efficiency through the selection of appropriate types of wood and adhesives or binders. However, commonly used adhesives and binders in this field are still produced from non-renewable feedstocks. Furthermore, many commonly used adhesives and binders are problematic in terms of their human toxicity and environmental impact.

A particular concern is the amount of formaldehyde present in engineered wood products such as composite wood panel products. Formaldehyde-based resins, such as urea-formaldehyde resins, are used to bind most composite wood products, such as particle board and MDF. In particular, urea formaldehyde is the cheapest binder and is considered to be the most simple to handle. As such, formaldehyde is commonly used in engineered wood used for interior furniture.

Formaldehyde is released into the air, both during the production of composite wood products and during the lifetime of composite wood products. Worryingly, various organisations, such as the National Research Council (US), ECHA (EU) and the International Agency for Research on Cancer IARC (International), have identified formaldehyde as a potential carcinogen and as an irritant.

Isocyanate-based binders and adhesives such as pMDI are formaldehyde-free alternatives commonly used in the engineered wood industry. They enable engineered wood articles to be produced that are mechanically very strong, but they are highly toxic before being cured, causing contact dermatitis and becoming particularly hazardous. Therefore use of these isocyanate-based binders and adhesives requires extensive retooling to safely enclose any machine or process unit where the isocyanate-based material is sprayed. In addition, isocyanate-based binders and adhesives are more expensive than UF resins. Furthermore, there have been problems in supplying isocyanate adhesives in sufficient quantities in recent years, due to lack of availability of raw materials.

Biologically sourced alternatives to formaldehyde-based binders, such as soy-based binders, have been developed. However, many still fail to act as effective binders or adhesives, producing products that are weaker than required in the engineered wood industry. It will be appreciated that strength is an important factor for many engineered wood products, which find uses in end products such as furniture and structural units.

In addition, binders that been developed to exploit biological resources are often based on resources that not available in quantities that would allow for widespread commercial use.

Some traditional biologically sourced alternatives also have a high viscosity, and therefore water must be added to counteract this so that the binder is usable; it will be appreciated that the binder must be mixed with filler material such as wood chips or sawdust to produce engineered wood products such as chipboard and particleboard. However, the addition of water increases curing time. Therefore, biologically sourced binders and adhesives have typically found only niche application.

Binders that are based on biological source material can also become unstable or deteriorate when stored. In particular, the effectiveness of such binders can reduce over time when stored. There is also a risk of mould growth on such biologically sourced binders.

In addition, binders can be relatively expensive to transport, especially in bulk quantities.

Accordingly, it is one object of the present invention to provide binders that can replace or reduce the use of traditional formaldehyde-based resins. A further object of the present invention is to provide binders that are non-toxic and can be prepared from sustainable sources. Articles may be prepared from such binders in combination with other non-toxic and sustainable raw materials, to provide articles that are non-toxic and prepared from sustainable sources.

A further objective of the present invention is to provide binders that have relatively low viscosity, such that they are easy to handle and can be readily mixed with filler material such as wood chips or sawdust, without requiring the addition of amounts of water that would adversely affect curing time.

A further objective of the present invention is to provide binders that can be used to prepare engineered wood products that have good strength characteristics.

A further objective of the present invention is to provide binders that are relatively stable when stored, without there being significant loss of efficacy after storage and/or signs of deterioration and/or mould growth.

A further objective of the present invention is to provide binders that are relatively cost effective to transport and/or that are easy to transport and/or that have a low carbon footprint.

A further objective is to provide precursors and products for use in the engineered wood industry that have good properties, e.g., composite wood products, and wood-based or paper-based precursors that can be used in the manufacture of composite wood products.

SUMMARY OF THE INVENTION

The present inventors have determined that a binder precursor can be produced that derives from the use of fungi or glucan as a starting material, together with the use of a starch, such as dextrin. The starting materials are treated with both alkali and acid, in the presence of an aqueous solvent system, and the resulting mixture is dried. In one embodiment it is formed into a powder.

The present invention provides, according to a first aspect, a method for preparing a binder precursor, the method comprising the steps of: i) mixing (A) fungi or glucan and (B) starch with an alkaline agent, in the presence of an aqueous solvent system, to form an alkaline composition; ii) mixing the alkaline composition with an acidic agent to form a mixture; and iii) drying the mixture and forming a powder therefrom, so as to form a binder precursor in powdered form. In one embodiment, step iii) comprises a) drying the mixture so as to form a dry composition; and b) forming a powder from the dry composition, so as to form the binder precursor in powdered form.

In an alternative first aspect, the present invention provides a method for preparing a binder precursor, the method comprising the steps of: i) mixing (A) fungi or glucan and (B) starch with an acidic agent, in the presence of an aqueous solvent system, to form an acidic composition; ii) mixing the acidic composition with an alkaline agent to form a mixture; and iii) drying the mixture and forming a powder therefrom, so as to form a powdered binder precursor. In one embodiment, step iii) comprises a) drying the mixture so as to form a dry composition; and b) forming a powder from the dry composition, so as to form the binder precursor in powdered form.

WO 2018/215742 A1 relates to the formation of binders from (A) fungi or glucan and (B) starch, by a process involving treatment with alkali and acid. It will be appreciated that all disclosures in this publication, which are incorporated herein by reference, are relevant to assisting the understanding of steps i) and ii) of the method of the first aspect of the present invention.

The present invention also provides, according to a second aspect, a binder precursor in powdered form obtainable by the method of the first aspect.

Because the binder precursor is dry, it can weigh significantly less, and can have a significantly lower volume, than liquid binders. Therefore, the binder precursor is more easily and cheaply stored and transported.

The binder precursor has also been found to be more stable, with the efficacy of the binder reducing at a lower rate over time.

A further benefit of the binder precursor being dry is that it can be less corrosive to equipment than liquid binders.

The aqueous solvent system used in the present invention comprises water. In one embodiment it may comprise 95 vol % or more, or 99 vol % or more, water. It may be water. However, preferably, the aqueous solvent system comprises water and an organic solvent.

It has been found that water is required in the solvent system to ensure that the fungi/glucan is able to be suspended in the aqueous solvent system. Anhydrous organic solvents such as acetone, methanol or ethanol do not suspend fungi/glucan.

However, using an organic solvent in addition to water as solvent means that the amount of water used can be reduced. Organic solvents can be easier to remove from a mixture than water. Therefore the use of organic solvent can facilitate the drying of the mixture and obtaining a powdered binder precursor.

The powered binder precursor can be used directly in applications where binding or adhesion is required, with the precursor being rehydrated in situ, by the presence of water in the location where the binder precursor is being used.

Alternatively, the powdered binder precursor can be mixed with water to form a rehydrated binder. The rehydrated binder can then be used in applications where binding or adhesion is required.

Surprisingly, both the powdered binder precursor and the rehydrated binder provide useful binding characteristics. It was not foreseeable that a dry powder or a product formed from rehydrating a powder would find utility in this way, in particular due to the powder having been derived from biological source material. Biological source material can be extremely sensitive to environmental conditions.

In one embodiment, residual moisture in or on in filler material or composite parts that are intended to be bound by a binder may be sufficient to rehydrate the powdered binder precursor in situ. This provides the benefit that a lower amount of water needs to be removed when the binder cures, allowing for articles and composite products to be rapidly produced.

Therefore, according to a third aspect, the present invention provides a method for producing a shaped article, the method comprising: a) providing a binder precursor of the second aspect; b) forming a binder composition by mixing the binder precursor with filler material; c) shaping the binder composition into a three-dimensional shape; and d) curing the binder composition to form a shaped article having said three-dimensional shape; wherein step c) and step d) can be carried out simultaneously or separately, and wherein during one or both of step c) and step d) pressure is applied to the binder composition.

According to a fourth aspect, the present invention provides a method of adhering two component parts to produce a composite product, each component part having a contact surface, the method comprising: a) providing a binder precursor as defined in the second aspect; b) applying the binder precursor to the contact surface of the first component part and/or the contact surface of the second component part; c) contacting the contact surface of the first component part with the contact surface of the second component part; and d) curing the binder precursor to provide the composite product.

According to a fifth aspect, the present invention provides a method for producing a shaped article which is an engineered wood product, the method comprising: a) providing a binder precursor as defined in the second aspect; b) forming a three-dimensional shape by combining the binder precursor and a plurality of component parts, with there being three or more component parts in the form of layers, each comprising wood, and with layers of binder being provided between the layers of wood; and c) curing the three-dimensional shape under pressure to form a shaped article having said three-dimensional shape.

Alternatively, as noted above, the powdered binder precursor can be mixed with water to form a rehydrated binder before use. A benefit of this option is that an end user can control how much water to add to the powdered binder precursor to suit their intended use of the rehydrated binder and factors such as how quickly they need the binder to cure.

Therefore, the present invention also provides, according to a sixth aspect, a method of making a rehydrated binder, the method comprising the steps of: i) providing a binder precursor according to the second aspect; and ii) mixing the binder precursor with water so as to form a rehydrated binder.

The present invention also provides, according to a seventh aspect, a rehydrated binder obtainable by the method of the sixth aspect.

Surprisingly, the present inventors have found that the rehydrated binder is an effective binder. Therefore, when considering factors such as storage and transportation, it is possible to take advantage of the benefits of a dry powdered product, but when the binder is used, having been rehydrated, there is no significant detriment to the usability of the binder or the strength characteristics of the shaped or composite products obtained from using the binder.

The binder precursor is rehydrated with water, which is likely to be readily available on-site wherever the binder is to be used.

As the powdered binder precursor is lighter than a comparably effective amount of liquid binder, a lower weight and/or volume of binder precursor can be transported for the same task. Transportation costs depend, at least in part, on the weight and/or volume of the material being transported. The reduced weight and/or volume of the binder precursor therefore means that it will be cheaper to transport. The "carbon footprint" of an end-product such as a shaped article or composite product can be reduced by use of the binder precursor of the invention, due to the reduction in carbon dioxide emissions during transportation.

The binder precursor has the additional benefit of being more stable to storage than wet binders. In particular, the binder precursor does not grow mould as quickly as wet binders. The binder precursor is also believed to retain its binding efficacy for longer than wet binders. Therefore, the binder precursor has a longer shelf-life.

It is beneficial that the binder precursor of the first aspect is in powdered form. This allows the binder precursor to be easily rehydrated to form a homogenous rehydrated binder. This homogeneity ensures that the rehydrated product is easy to use and has consistent binding characteristics.

The binder precursor and the rehydrated binder of the present invention can be used in relatively low proportions as compared to the amount of filler material (e.g., wood chips or sawdust) in the three-dimensional shaped composite product, reflecting their excellent structural characteristics.

The binder precursor and the rehydrated binder have good binding properties and good adhesive properties. They can, therefore, be (I) used as a binder, specifically to form three dimensional shaped articles from cured binder, wherein these articles have component parts (e.g., wood chips or sawdust) dispersed through the cured binder; and/or (II) used as an adhesive, to secure two surfaces together (e.g., they can be used as a label adhesive or to form laminates or other composite products).

The methods of the invention are scalable due to the ease of the manufacturing process and abundance of the raw materials employed. In a preferred embodiment the binder precursor uses fungi, such as yeast or mushrooms, as a key raw material, together with starch. Yeast is cheap and used on a vast scale in both brewing and baking. Spent yeast is readily available. As shown in the Examples, yeast of the type used for animal feed (which may be low-grade yeast), can be employed in the present invention to produce strong engineered wood products. As such, the invention can provide sustainably sourced articles.

The binder precursor and rehydrated binder of the present invention have been determined to have good and useful properties in terms of their ability to bind and adhere. When fungi, e.g., yeast, is used as a starting material, the binder precursor and rehydrated binder have the further benefit of being formed from a source material that is readily available, meaning that the binder precursor, and therefore the rehydrated binder also, is able to be produced on a large scale. Fungi is, additionally, environmentally friendly and comes from a renewable source. Thus the invention has the potential to be a widespread commercially viable option, rather than solely a niche solution.

Articles as made by the methods of the invention are advantageously resilient and strong, for example, in terms of their resistance to forces such as compression, and/or in terms of their durability. In particular, articles as made by these methods of the invention are advantageously resilient and strong in terms of their modulus of rupture (MOR), modulus of elasticity (MOE), and in a three-point bending test.

The shaped articles that are made by the methods of the invention are solid. Articles in the shape of boards made according to the invention are particularly strong when heat-pressed, and advantageously can be used in the production of items of furniture or structural items. Shaped articles made by the methods of the invention may be, for example, construction articles, such as insulation boards (such as low-density insulation boards); flooring structures or roofing structures (including tiles, sheets and panels); packaging articles, such as crates, boxes or trays; or furniture articles, such as tables, chairs or stools. However, the invention is not limited to a particular type of article.

The present inventors have determined that the curing time required for the composition is important for efficient industrial application of the present invention. The binder precursor and rehydrated binder according to the present invention can be cured rapidly, and may achieve curing times of around 10 to 20 seconds per mm of board thickness, e.g., from 12 to 18 seconds per mm of board thickness. This is not dissimilar to the curing times of conventional binders. Furthermore, such curing times are amongst the fastest curing times of any currently available bioadhesive.

A yeast-based adhesive has been described in Kadimaliev et al., BioResources (2012) 7(2), 1984-1993. The adhesive was made by mixing brewer's yeast with either hydrochloric acid or sodium hydroxide. The Kadimaliev et al. paper only describes the use of its yeast derivatives as glues for paper, cardboard or wood—i.e., for holding two such surfaces together. Furthermore, significantly, the Kadimaliev et al. paper only describes products that have been formed by subjecting yeast to treatment with acid or with alkali.

The present inventors have surprisingly found that the treatment of a starting material comprising yeast together with starch with both acid and alkali produces a product that is advantageous as compared to a product that is made using only acid treatment or base treatment. In this regard, the resulting product from a dual treatment has excellent binder characteristics, being able to be easily mixed with filler material (such as wood chips or sawdust) and resulting in unexpectedly strong engineered wood products. In contrast, the resulting product from a single treatment (acid or alkali)

cannot usefully be used as a binder because it does not readily mix with filler material (such as wood chips or sawdust) and does not result in strong composite products.

Meanwhile, the biological field has long recognised that methods comprising stirring yeast with alkali and acid can be used to lyse yeast cells, liberating cellular components. This is described in, for example, Biochem. J. (1966) 101, 36c and Biochem. J. (1937) 81, 72. However, this document does not contemplate any potential commercial uses of the lysed cells; it is focused on examining more highly purified specimens of the cell wall, such as glucans and chitin. Indeed, despite this lysis being described in the 1960s, no commercial use for the lysed cells has apparently been determined to date. Further, the techniques used to lyse yeast cells in the prior art in the biological field are different to the preferred conditions used in the methods of the present invention. In particular, the prior techniques had the intended aim to study materials, meaning that it was desired to keep cell materials intact and minimise denaturing of protein materials.

US 2005/0130273 describes methods for isolating cell wall derivatives from fungal or yeast biomass, in particular using *Aspergillus niger* biomass. These methods are focused on the isolation of chitin and preparing chitin polymers and chitosan that are not animal derived. The methods are used to produce products such as hydrogels, films and porous objects. The end uses are in areas such as healthcare, cosmetics, and food. Although the methods use an alkali treatment and an acid treatment, it is described as essential to discard the alkali-soluble fraction before adding the acid.

JP S49-92308 describes the manufacture of a composition for use as a paper coating that improves the gloss of that paper. The coating is applied to the paper and allowed to dry. The binding agent used within the coating is obtained from yeast (*Pichia miso* biomass) in wet form, as a cleansing milk having a bacterial cell concentration of approximately 10 wt %. Although the methods of producing the binding agent use an alkali treatment and an acid treatment, after the alkali treatment the residue was separated by centrifugation and removed, and then acid was added, and then precipitated proteins were separated and recovered by a centrifuge.

JP S53-24098 also describes the manufacture of a composition for use as a paper coating. The coating is applied to the paper and allowed to dry. The binding agent used within the coating is obtained by adding heating a microorganism with an acid, at a pH of 2.0 to 5.0, before alkali was added to bring the pH to 10 to 16, as well as adding a surfactant, and heating, before then adding acid to adjust the pH to 3 to 5, so as to precipitate out a complex of protein and surfactant. It is this white powder precipitate as obtained by separation which is then used in the coating composition.

RU 2404222 describes adhesives made from brewer's yeast, boric acid and sodium hydroxide. The adhesive is described as being useful for gluing. To obtain the adhesive yeast is treated with sodium hydroxide in a 1:1 ratio and this is then combined with boric acid and glycerin. The boric acid is used in amounts of 0.1-0.3% with the amount of alkali-treated yeast sediment being 96.0-98.0%.

GB 2 185 489 describes adhesives made by treating yeast with alkali and optionally also with acetic acid. The adhesive is described as being useful for bonding two adjacent surfaces.

WO2017/075725 describes a process of preparing a yeast extract, which is used to make particleboards. The document describes that yeast cells were thermally lysed, before proteins were isolated from the yeast using centrifugation, an energy intensive step. The protein isolate was used to make particle board. In this regard, a 10 mm thick particleboard was cured in a time of 24 seconds/mm of board thickness. Alkali and acid treatment of the yeast is not described; the treatment used is thermal and is designed to obtain a protein isolate.

As evidenced by the present Examples, the present inventors have surprisingly found that binder precursors and rehydrated binders can be obtained from fungi (such as yeast or mushrooms) or glucan (such as beta-glucan), together with starch (such as dextrin), which have been found to be highly effective at forming shaped articles, especially sheets or panels or tiles, which are strong, resilient and versatile. The binder precursors are obtained by a treatment with both alkali and acid, followed by drying and being formed into a powder. In some alternative embodiments the binder precursors are dried into the form of a coating, or an agent impregnated into pores, rather than being formed into a powder. This combination of starting materials and treatments is new and is surprisingly effective.

Whilst products formed from acid and/or base treatment of biomass have been formed before, these were used as binding agents in coating compositions, or as standard adhesives. These are not binders.

As the skilled person will appreciate, a binder is a substance that can be blended or mixed with another material in the form of particles or other pieces and that, once cured, serves to hold them together to form a shaped cohesive whole. The characteristics of an effective binder are therefore not identical to those of an adhesive or a binding agent in a coating composition. A binder must be able to be readily blended or mixed with another material in the form of particles or other pieces. A binder must be able to cure to give three dimensional strength, so as to provide a useful composite product where the combined binder and filler material are held together to provide a strong and resilient shaped article.

The most common thickness of particleboard is 18 mm, and the thicker the board is the more difficult it is to cure the core. The present invention can be used to produce particleboards that are 18 mm thick and that are cured in about 10-20 seconds/mm of thickness, e.g., 12-18 seconds/mm of thickness. The ability to produce boards thicker than 10 mm and with fast curing speeds when using a non-toxic binder is a significant technical advance provided by the present invention.

The shaped articles provided in accordance with the present invention have a good and useful modulus of rupture and modulus of elasticity. The rehydrated binders as provided by the present invention also have a low viscosity relative to their solid content. The binder precursors and rehydrated binders as provided by the present invention mix well with filler material (such as wood chips, sawdust or wood fibres). The low viscosity of the rehydrated binders as provided by the present invention means that the rehydrated binder can have a relatively low water content, allowing the rehydrated binder to cure quickly by evaporating water whilst also enabling facile mixing with filler material. The binder precursors and rehydrated binders as provided by the present invention have a short curing time, particularly when cured by hot pressing. These advantageous technical effects are shown in the Examples.

A further benefit is that products made using the binder precursor or rehydrated binder have water resistance that is sufficient for indoor applications. Thickness swelling and water absorption of particleboards made according to the invention and soaked 24 hours in water were similar to the performance of urea-formaldehyde.

Furthermore, the articles provided by the present invention are not toxic to human health and are environmentally benign in part due to their low or non-existent formaldehyde and/or VOC content.

The binder precursor and/or rehydrated binder of the present invention can also easily be integrated into existing manufacturing processes within the engineered wood industry to partially or fully replace existing urea-formaldehyde resins. Thus products such as particle board can usefully be made using the present invention. However, it will also be appreciated that the benefits and uses of the binder precursor and rehydrated binder of the present invention are applicable in fields beyond the engineered wood industry.

The combination of good strength together with the ability to have a non-toxic product and the ability to use naturally sourced starting material, as well as the low transport costs and good storage characteristics for the powdered binder precursor and the flexibility for an end user to choose how much water to add to rehydrate the binder, means that there are many potential end uses for the invention, including in furniture, construction and packaging.

The present invention also provides, according to an eighth aspect, a method for producing a shaped article, the method comprising: a) providing a rehydrated binder according to the seventh aspect; b) forming a binder composition by mixing the rehydrated binder with filler material; c) shaping the binder composition into a three-dimensional shape; and d) curing the binder composition to form a shaped article having said three-dimensional shape; wherein step c) and step d) can be carried out simultaneously or separately, and wherein during one or both of step c) and step d) pressure is applied to the binder composition. Optionally, in the method of the eighth aspect, step a) comprises producing the rehydrated binder by carrying out the method of the sixth aspect.

The shaped articles according to the method of the eighth aspect may usefully be engineered wood products, such as particleboard, chipboard or fibreboard (e.g., MDF or insulation board). For example, the filler material may comprise wood and the shaped article may be an engineered wood product.

The inventors have also determined that the rehydrated binder of the present invention provides excellent adhesion between two surfaces. The present invention therefore also provides, according to a ninth aspect, a method for producing a shaped article which is an engineered wood product, the method comprising: a) providing a rehydrated binder according to the seventh aspect; b) forming a three-dimensional shape by combining the rehydrated binder and a plurality of component parts, with there being three or more component parts in the form of layers, each comprising wood, and with layers of binder being provided between the layers of wood; and c) curing the three-dimensional shape under pressure to form a shaped article having said three-dimensional shape. Optionally, in the method of the ninth aspect, step a) comprises producing the rehydrated binder by carrying out the method of the sixth aspect. The shaped article made by the method of the ninth aspect of the invention may usefully be plywood.

The present invention also provides, according to a tenth aspect, a method of adhering two component parts to produce a composite product, each component part having a contact surface, the method comprising: a) providing a rehydrated binder according to the seventh aspect; b) applying the rehydrated binder to the contact surface of the first component part and/or the contact surface of the second component part; c) contacting the contact surface of the first component part with the contact surface of the second component part; and d) curing the rehydrated binder to provide the composite product. Optionally, in the method of the tenth aspect, step a) comprises producing the rehydrated binder by carrying out the method of the sixth aspect.

Pressure may be applied during step c) and/or step d) of the method of the fourth aspect or the tenth aspect to assist with the securing of the two components together.

The rehydrated binder of the invention can undergo one or more cycles of being dried and rehydrated. In dry form it can be considered a binder precursor. It can be provided in dry form by itself, e.g., in the form of a powder, but it can alternatively be provided in dry form in combination with a support. For example, it can be provided in dry form as a coating on a surface and/or as an impregnating agent that is dried in pores extending from a surface. The surface may, for example, be a surface of a component part of a composite product (e.g., a component part that is made of paper or wood). The surface may be a surface of a filler material, e.g., wood-based filler material such as wood chips, saw dust, wood fibres and/or wood shavings. When the binder precursor is rehydrated it can be cured (with heat and/or pressure) in order to achieve a binding or adhering effect.

According to an eleventh aspect, therefore, the present invention provides a method of preparing a precursor to a composite product or a precursor to a shaped article, the method comprising: a) providing a rehydrated binder according to the seventh aspect; b) applying the rehydrated binder to a surface of a first component part of the composite product or to a surface of filler material for the shaped article; and c) allowing the rehydrated binder to dry. The rehydrated binder may suitably be applied to the surface at a loading level of 1 $g/m^2$ or more, e.g., 5 $g/m^2$ or more or 10 $g/m^2$ or more; it may be from 1 to 500 $g/m^2$ or from 5 to 300 $g/m^2$ or from 10 to 200 $g/m^2$, e.g., from 20 to 100 $g/m^2$, such as about 50 $g/m^2$. Applying the rehydrated binder to a surface of filler material may suitably involve mixing the binder and the filler material. The binder and the filler material my then be dried together.

According to a twelfth aspect, the present invention provides a method of preparing a precursor to a composite product or a precursor to a shaped article, the method comprising: a) providing a mixture, either by: i) mixing (A) fungi or glucan and (B) starch with an alkaline agent in the presence of an aqueous solvent system to form an alkaline composition; and ii) mixing the alkaline composition with an acidic agent to form the mixture; or by i) mixing (A) fungi or glucan and (B) starch with an acidic agent in the presence of an aqueous solvent system to form an acidic composition; ii) mixing the acidic composition with an alkaline agent to form the mixture; b) applying the mixture to a surface of a first component part of the composite product or to a surface of filler material for the shaped article; and c) allowing the mixture to dry. The mixture may suitably be applied to the surface at a loading level of 1 $g/m^2$ or more, e.g., 5 $g/m^2$ or more or 10 $g/m^2$ or more; it may be from 1 to 500 $g/m^2$ or from 5 to 300 $g/m^2$ or from 10 to 200 $g/m^2$, e.g., from 20 to 100 $g/m^2$, such as about 50 $g/m^2$. Applying the rehydrated binder to a surface of filler material may suitably involve mixing the binder and the filler material. The binder and the filler material my then be dried together.

In one embodiment of method of the eleventh and the twelfth aspects, the rehydrated binder or the mixture dries on the surface of the first component part or on the surface of the filler material for the shaped article, so as to form a coating on the surface.

In another embodiment, the first component part is porous (e.g., it may be paper) or the filler material is porous and the rehydrated binder or the mixture partly or fully penetrates pores that are connected to the surface of the first component part or the filler material, and dries in these pores, so as to form an impregnated first component part or impregnated filler material. Impregnation of paper with phenol, melamine and urea resins is known in the art and the impregnation of paper with the rehydrated binder/mixture according to the invention can be implemented in a similar manner.

When the methods of the eleventh and the twelfth aspects are used to form a precursor to a composite product, these methods result in a composite product precursor which comprises a first component part of the composite product having a binder precursor located at or near a surface thereof. This composite product precursor can then be adhered to a second component part of the composite product by contacting the surface of the first component part with a surface of the second component part of the composite product and curing the binder precursor. Advantageously, there is no need for solvent to be added to rehydrate the binder precursor. In this regard, it may be that sufficient moisture is provided by the atmosphere and/or by the component part(s), especially if they comprise wood.

When the methods of the eleventh and the twelfth aspects are used to form a precursor to a shaped article, these methods result in filler material product having a binder precursor located at or near a surface thereof. This filler material can then be used in a method according to the third aspect or fifth aspect. The use of the filler material product having a binder precursor located at or near a surface thereof in these methods may lead to the formation of stronger products.

The filler material product having a binder precursor located at or near a surface thereof can also be used to make shaped products without requiring the addition of any further binder, by applying heat and pressure to this filler material.

According to a thirteenth aspect, the present invention provides a composite product precursor, which comprises a first component part of the composite product having (a) a binder precursor as a coating on a surface thereof and/or (b) a binder precursor as an impregnating agent in pores thereof, obtainable by the method of the eleventh or twelfth aspect. Providing a binder precursor in this ready-to-use form may be highly beneficial for industrial processes and commercial applications. The first component part of the composite product may, for example, be paper, such as standard foil lamination paper (also known as decorative-finish foil paper), or may be a wooden component part, e.g., a component part made from plywood, MDF, particleboard or chipboard.

According to a fourteenth aspect, the present invention provides a shaped article precursor which comprises filler material for use in the shaped article having (a) a binder precursor as a coating on a surface thereof and/or (b) a binder precursor as an impregnating agent in pores thereof, obtainable by the method of the eleventh or twelfth aspect.

According to a fifteenth aspect, the present invention provides a method of forming a composite product, the method comprising: a) providing a composite product precursor according to the thirteenth aspect; b) contacting the binder precursor with a surface of a second component part of the composite product; and c) applying heat and/or pressure to cure the binder precursor and adhere the first component part of the composite product to the second component part of the composite product so as to provide the composite product. In one embodiment, step a) is carried out by carrying out the method of the eleventh or twelfth aspect. The second component part may, for example, be a wooden component part, e.g., a component part made from plywood, MDF, particleboard or chipboard.

According to a sixteenth aspect, the present invention provides a method for producing a shaped article, the method comprising: a) providing a shaped article precursor according to the fourteenth aspect; b) optionally mixing the shaped article precursor with a crosslinker; c) shaping the shaped article precursor into a three-dimensional shape; and d) curing the binder precursor, to form a shaped article having said three-dimensional shape; wherein step c) and step d) can be carried out simultaneously or separately, and wherein during one or both of step c) and step d) pressure is applied to the binder precursor.

Surprisingly, the binder in dry form (which, as noted above, can be considered a binder precursor) can even be utilised after curing. In other words, the binder in dry form can be obtained from an existing product where the wet form of the binder was used to make a product by curing under heat and/or pressure. Therefore an engineered wood product made from the wet form of the binder can be recycled, by breaking it up into a plurality of pieces (e.g., into wood chips, wood shavings, wood fibres and/or sawdust) and then these pieces will have binder precursor on their surfaces and possibly in any pores or voids therein. These pieces can then be used to make a new engineered wood product, e.g., particleboard.

Therefore the binders of WO 2018/215742 A1 can be re-used, even after being heated and/or pressed. This could be beneficial in specific industrial process applications. The dry binder on the wood pieces will contribute to the strength of new engineered-wood products, and thus no additional binder, or less additional binder, will be needed when making such new products. The dry binder on the wood pieces may optionally be rehydrated by mixing with water.

These characteristics make the binders different from formaldehyde-based binders which cannot be reused once hardened.

This is also highly relevant because the engineered-wood industry relies widely on recycled wood, and in particular some particleboard manufacturers use more than 40% of recycled wood chips to make their products.

Therefore the present invention also provides, according to a seventeenth aspect, a method of obtaining a wood-based filler product, the method comprising:
I) providing an engineered wood product, wherein the engineered wood product was made by a method comprising:
a) providing a binder, wherein the binder has been produced by a process of:
i) mixing (A) fungi or glucan and (B) starch with an alkaline agent to form an alkaline composition; and mixing the alkaline composition with an acidic agent to form the binder; or
ii) mixing (A) fungi or glucan and (B) starch with an acidic agent to form an acidic composition; and mixing the acidic composition with an alkaline agent to form the binder;
b) forming a binder composition by mixing the binder with wood-based filler material;
c) shaping the binder composition into a three-dimensional shape; and
d) curing the binder composition to form an engineered wood product which is a shaped article having said three-dimensional shape;

wherein step c) and step d) can be carried out simultaneously or separately, and wherein during one or both of step c) and step d) pressure is applied to the binder composition;
and
II) breaking up the engineered wood product into a plurality of pieces.

The present invention also provides, according to an eighteenth aspect, a method of obtaining a wood-based filler product, the method comprising:
I) providing an engineered wood product, wherein the engineered wood product was made by a method comprising:
  a) providing a binder, wherein the binder has been produced by a process of:
    i) mixing (A) fungi or glucan and (B) starch with an alkaline agent to form an alkaline composition; and mixing the alkaline composition with an acidic agent to form the binder; or
    ii) mixing (A) fungi or glucan and (B) starch with an acidic agent to form an acidic composition; and mixing the acidic composition with an alkaline agent to form the binder;
  b) forming a three-dimensional shape by combining the binder and a plurality of component parts, with there being three or more component parts in the form of layers, each comprising wood, and with layers of binder being provided between the layers of wood; and
  c) curing the three-dimensional shape under pressure to form an engineered wood product which is a shaped article having said three-dimensional shape;
and
II) breaking up the engineered wood product into a plurality of pieces.

The present invention also provides, according to a nineteenth aspect, a method of obtaining a wood-based filler product, the method comprising:
I) providing an engineered wood product, wherein the engineered wood product was made by a method comprising:
  a) providing a binder wherein the binder has been produced by a process of:
    i) mixing (A) fungi or glucan and (B) starch with an alkaline agent to form an alkaline composition; and mixing the alkaline composition with an acidic agent to form the binder; or
    ii) mixing (A) fungi or glucan and (B) starch with an acidic agent to form an acidic composition; and mixing the acidic composition with an alkaline agent to form the binder;
  b) applying the binder to the contact surface of the first component part and/or the contact surface of the second component part;
  c) contacting the contact surface of the first component part with the contact surface of the second component part; and
  d) curing the binder to provide the composite product;
and
II) breaking up the engineered wood product into a plurality of pieces.

In the methods of the seventeenth, eighteenth and nineteenth aspects, step II) suitably involves forming wood chips and/or sawdust from the engineered wood product. Other forms of filler material that can be made from wood could also be contemplated, e.g., wood fibres and/or wood shavings.

The skilled reader will appreciate that the size and number of pieces formed in step II) is dependent on their intended use. The intention is that wood-based filler product is obtained that can be used in the manner already well known in the art, e.g., for forming particleboards and/or other engineered wood products from wood-based filler material. However, in one embodiment step II) forms four or more pieces, or ten or more pieces, or twenty or more pieces, or fifty or more pieces.

The invention also provides, in a twentieth aspect, a wood-based filler product, which comprises wood-based material having (a) a binder precursor as a coating on a surface thereof and/or (b) a binder precursor as an impregnating agent in pores or voids therein, obtainable by the method of any one of the seventeenth, eighteenth and nineteenth aspects.

The invention also provides, in a twenty-first aspect, a method for producing a shaped article, the method comprising:
  a) providing a wood-based filler product as defined in the twentieth aspect;
  b) optionally mixing the wood-based filler product with water and/or a crosslinker;
  c) shaping the wood-based filler product into a three-dimensional shape; and
  d) curing the binder precursor to form a shaped article having said three-dimensional shape;
  wherein step c) and step d) can be carried out simultaneously or separately,
  and wherein during one or both of step c) and step d) pressure is applied to the wood-based filler product.

In one embodiment, step a of providing a wood-based filler product involves carrying out the method of any one of the seventeenth, eighteenth or nineteenth aspects.

If in step b) the wood-based filler product is mixed with water, this may be in the form of an aqueous solvent system as described in the present disclosure. If in step b) the wood-based filler product is mixed with a crosslinker, this may be a crosslinker as described in the present disclosure.

The present invention also provides, according to a twenty-second aspect, an article obtainable by the method of the third aspect, the fifth aspect, the eighth aspect, the ninth aspect, the sixteenth aspect or the twenty-first aspect, or a composite product obtainable by the method of the fourth aspect, the tenth aspect or the fifteenth aspect. Such an article or composite product may suitably be a packaging article, a construction article, or a furniture article.

Composite products as made by the method of the fourth aspect, the tenth aspect or the fifteenth aspect of the invention have been found to have better joint strength than composite products formed using conventional adhesives, for example being able to withstand almost twice the load before the joint fails.

The inventors have surprisingly found that articles as made by the methods of the invention may have beneficial characteristics. The rehydrated binder may impart excellent mechanical and chemical properties to the article it is used to form. The article may, in particular, be resilient and strong.

The present invention provides binders that may have surprisingly good adhesive characteristics. It is believed that the use of the specific alkaline and acid treatments gives rise to these characteristics. The treatments are believed to provide an effective breaking down of the fungi cell walls and then re-linking of hydrolysed material from the fungi cells, which occurs under substantially neutral conditions.

The inclusion of starch, e.g., dextrin, together with the fungi leads to excellent strength characteristics in the end product.

In one embodiment the composite product is a wood-based product. In another embodiment the composite product is a container (e.g., a bottle or jar) and a label which are secured together, to form a labelled container.

In all aspects of the invention, it can be preferable for a crosslinker, e.g., PAE, to be included in the binder as well. The crosslinker may be mixed with the mixture, the dry composition, the powdered binder precursor, or the rehydrated binder. Preferably the rehydrated binder comprises a crosslinker. This may improve the properties of the rehydrated binder, as discussed in more detail below and as shown in the Examples.

BRIEF DESCRIPTION OF THE DRAWINGS

So that the manner in which the above recited features, advantages and objects of this disclosure are attained and may be understood in detail, a more particular description, briefly summarized above, may be had by reference to the embodiments thereof which are illustrated in the drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1A:
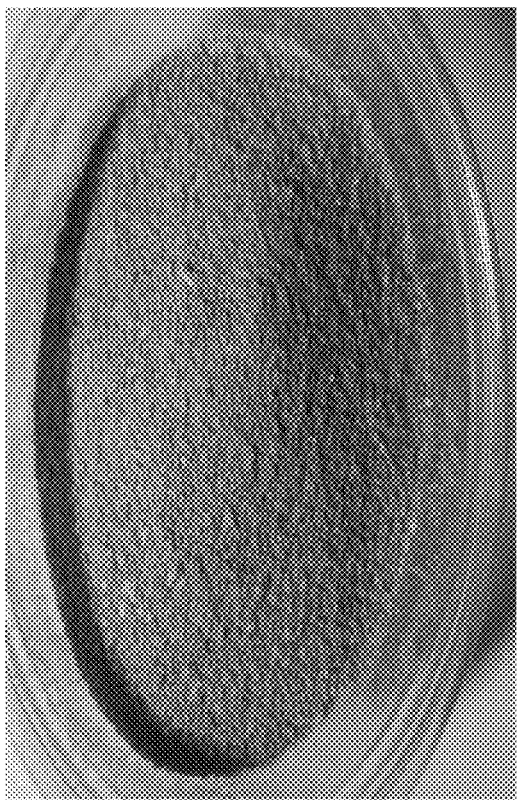
FIG. 1a is a photograph of powdered binder 2' according to the invention, as made in Example 2.

In the present invention a dry, powdered binder precursor can be made. This can be mixed with water to form a rehydrated binder. A shaped article and/or a composite product can be formed directly from the binder precursor and/or from the rehydrated binder. A dry binder precursor can also be formed as a coating. A dry binder precursor may be provided on the surface of a substrate or filler material and/or may be in pores extending from the surface. The binder precursor and/or rehydrated binder may be fungi-based, i.e., it is made using fungi as a starting material, or may be made using glucan (e.g., beta-glucan) as a starting material. All optional embodiments and disclosed features within the following description apply to all aspects of the invention except where contradictory with the definition of a given aspect as provided in the above Summary of the Invention.

The binders of the present disclosure can be dehydrated to form a powder and subsequently rehydrated to form a useful binder. There is no significant loss of strength between the original binder and the rehydrated binder. The binder precursors of the invention are suitable for long-term storage and transport, and are effective.

The dried binder can be used directly, for example by mixing the dry powder with wood chips and hot pressing them to make particleboards. In other instances, the original wet binder or the rehydrated binder can be applied onto the surface of a substrate, e.g., by applying a layer of binder on plywood sheets, particleboard surface, paper surface, or the like, and then dried. The substrate with the dried or semi-dried binder coated on (and/or impregnated therein, when the substrate is porous) can later be hot pressed to another substrate.

The ability to produce high strength engineered wood products using wet, rehydrated or dry binder, depending on the industrial environment, makes the present invention versatile. The present invention can produce non-toxic, commercially desirable, engineered wood products.

In one embodiment, the binder precursor can be produced by mixing (A) fungi (e.g., yeast) or glucan (e.g., beta-glucan) and (B) starch (e.g., dextrin) with an alkaline agent and then subsequently with an acidic agent, followed by drying and forming a powder from the resultant mixture. A rehydrated binder can be produced by mixing the binder precursor with water.

In an alternative embodiment, the binder precursor can be produced by mixing (A) fungi (e.g., yeast) or glucan (e.g., beta-glucan) and (B) starch (e.g., dextrin) with an acidic agent and then subsequently with an alkaline agent, followed by drying and forming a powder from the resultant mixture. A rehydrated binder can be produced by mixing the binder precursor with water.

The present inventors have determined that a useful binder precursor and/or rehydrated binder can be formed from a natural source material, namely fungi. Particularly suitable fungi include those capable of forming biofilms and/or colonies. Fungi that contain glucans, such as beta-glucans, are especially suitable for use in the present invention.

Examples of fungi that may be contemplated for use include, but are not limited to, species of the *Saccharomyces genus*, species of the *Candida* genus, *Cryptococcus neoformans*, species of the *Trichosporon* genus, and species of the *Aspergillus* genus, such as *Aspergillus fumigatus* and *Aspergillus niger*. Other examples that can be mentioned included those of the genus *Penicillium*, the fungus *Trychoderma*, *Aspergillus oryzae* and *Fusarium venenatum*. In one embodiment the fungi may be *Saccharomyces cerevisiae*, *Saccharomyces boulardi*, *Saccharomyces uvarum*, *Candida albicans, Candida glabrata, Candida parapsilosis, Candida dubiliensis, Candida tropicalis*, or *Trichosporon asahi*.

In one embodiment the fungi may be *Lentinula edodes* (shiitake mushroom), *Trametes versicolor* (turkey's tail mushroom), *Inonotus obliquus* (chaga mushroom) or *Hericium erinaceus* (lion's mane mushroom). These fungi are not yeasts but, as shown by the examples, have been shown to produce effective binder precursors and/or rehydrated binders. When using non-powdered fungi, such as mushrooms, it may be necessary to grind the fungi into a powder prior to treating with the alkali.

The fungi may be in the subkingdom Dikarya. In one embodiment the fungi is in the phylum *Ascomycota* or the family basidiomycota. In one preferred embodiment the fungi is a yeast. In one embodiment the fungi is selected from wild yeasts, such as *Pichia, Kloeckera*, and *Torulopsis*. In another embodiment the fungi is a yeast of the *Saccharomyces* genus.

The yeast is suitably *Saccharomyces cerevisiae* yeast, especially of the baker's yeast strain. In one preferred embodiment the yeast is brewer's yeast, such as spent brewer's yeast, or baker's yeast. However, other forms of yeast could be contemplated.

Preferably the yeast is sourced from baker's yeast, or from brewer's yeast (such as spent brewer's yeast), or it may be yeast of the type used for animal feed (which may be low-grade yeast). Baker's yeast may be sourced from Lallemand (Fermipan); low-grade yeast may be sourced from Cangzhou Xindewei Animal Drug Co.; and spent brewer's yeast may be sourced from the brewing process. Yeast that is typically used in animal feed typically contains about 40-60% by weight of a mixture of *Candida* and *Saccharomyces* yeast, and other components such as ashes.

The yeast may be in a dry powdered form or may be a by-product of the brewing process. In dry powdered form, yeast has a typical water content of around 4% by weight, such as 2-8 wt %, whereas spent brewer's yeast has a typical water content of 10-70 wt %.

In the case of spent brewer's yeast, before the yeast is used to make the binder its water content may be decreased. This may suitably be achieved using air drying, oven drying, or a centrifuge. The use of high temperatures, such as above 40° C., may denature and/or destroy useful cell wall biomolecules. Therefore preferably the drying is achieved at 40° C. or below, e.g., at about room temperature. The use of a centrifuge at, for example, 1000-5000 (e.g., about 3000) revolutions per minute, or at centrifugal force of from 8000 g to 12000 g, for a period of time from 1 to 30 minutes (e.g., about 10 minutes) may be suitable.

In general, it is preferable that the fungi in the form as used to make the binder precursor has a water content of 25 wt % or less, e.g., 20 wt % or less or 15 wt % or less, such as 10 wt % or less. In one embodiment it has a water content of from 0.5 to 20 wt %, e.g., from 1 to 15 wt % or from 2 to 10 wt %.

As the skilled person will appreciate, the moisture content may be determined by measuring the electrical conductivity, at 20° C. and atmospheric pressure, using a conductive sensor. A conductive sensor uses two electrodes inserted directly into the material to measure its conductivity. The sensor can determine the material's moisture content from this measurement because each material has a specific conductivity that changes based on its moisture content.

As an alternative to fungi, glucan, e.g., beta-glucan, can be used as the starting material. The Examples show that the use of fungi and the use of glucan both lead to excellent results in terms of the properties of the end product. However, fungi, e.g., yeast, may be preferred as the starting material due to the fact it is a natural source material and is readily available. In the case of materials such as spent brewer's yeast or baker's yeast the material is also low cost.

Beta-glucan can be sourced commercially, e.g., from Naturheilpraxid Bedarf, Germany.

The glucan, e.g., beta-glucan, can suitably have a water content of up to 10 wt %, e.g., from 1 to 7 wt % or from 2 to 6 wt %, such as from 3 to 5 wt %.

The starting material used in the present invention comprises the fungi, e.g., yeast, or the glucan, e.g., beta-glucan, in combination with starch.

In this regard, a starch, such as dextrin or another modified starch, is provided in combination with the fungi or glucan before the treatment with alkaline agent and acidic agent is carried out. The starch and the fungi or glucan may be mixed together before the treatment with alkaline agent and acidic agent is carried out. The inclusion of the starch as a starting material is thought to be important because the starch is understood to be alkalised by treatment with the alkaline agent. This means that it forms a better macromolecular structure with the glucans of the yeast. Therefore the resulting binder has an increased binding strength. If the starch, such as dextrin or another modified starch, is added after the treatment with alkaline agent and acidic agent is carried out then the resulting product is hard to mix and furthermore shaped articles formed from the cured product are less strong.

The type of starch used is not particularly limited. Examples of starch materials that can be contemplated for use include: modified starches (e.g., starches that have undergone dextrinization); cationic starches; carboxymethyl starches; oxidised starches; bleached starches; and monostarch and distarch phosphates. Acetylated starches can have high viscosity, but could still be contemplated, especially for surface applications, e.g., in the method of the fourth aspect, the fifth aspect, the ninth aspect, the tenth aspect, the eleventh aspect, the twelfth aspect and/or the fifteenth aspect of the invention. Likewise, hydroxypropyl starches can increase viscosity, but are very strong and could certainly be contemplated especially for surface applications, e.g., in the method of the fourth aspect, the fifth aspect, the ninth aspect, the tenth aspect, the eleventh aspect, the twelfth aspect and/or the fifteenth aspect of the invention.

Preferably the starch is selected from: dextrin or other modified starches, amylose, amylopectin and maltodextrin. More preferably the starch is dextrin.

Whilst starches, such as dextrin, have found application within the paper and pulp industries, the engineered wood industry has not yet found a use for starches, such as dextrin, as they do not possess sufficient binding characteristics. However, the present inventors have surprisingly found that when the articles or composite products of the present invention are made without a starch as a starting material, the articles or composite products are inferior in terms of their strength, as measured by the modulus of rupture.

In particular, dextrin has been shown to be particularly effective in increasing the strength of articles provided by the methods of the present invention. Dextrins are low molecular weight forms of starch that are refined with a simple process from starch. In particular, dextrins can be produced by the hydrolysis of starch or glycogen. Dextrins can be produced from starch using enzymes such as amylases, or by applying dry heat under acidic conditions (pyrolysis or roasting). Dextrins are mixtures of polymers of D-glucose units linked by $\alpha$-(1→4) or $\alpha$-(1→6) glycosidic bonds.

The dry starting materials, namely the fungi or the glucan in combination with the starch, preferably include the starch, such as dextrin, in an amount of up to 50% by weight, e.g., up to 40% by weight. The dry starting materials preferably include the starch in an amount of 0.001% or more by weight, such as 0.005% or more by weight, or 0.01% or more by weight.

The dry starting materials may suitably include the starch in an amount of from 0.001% to 70%, such as from 0.01% to 70%, or 0.01% to 60%, for example from 0.1% to 70%, or 0.1% to 60%, or 0.5% to 60%, or 1% to 60%, such as from 5% to 60%, or 10% to 60%. The dry starting materials may, for example, include the starch in an amount of from 0.001% to 50%, or 0.001% to 40%, or 0.01% to 50%, or 0.01% to 40%, such as 0.1% to 20%, or 0.5% to 15%, or 0.5% to 10%, or 1% to 10%, or 1% to 5% by weight. In one embodiment the starch is included in an amount of 0.1 to 15% by weight, such as from 0.1% to 10% by weight. In one embodiment, starch may be included in an amount of 0.5 to 15% by weight, such as from 0.5% to 10% by weight. In one preferred embodiment the amount of starch in the dry starting material is from 20% to 60%, such as from 25% to 55%, or from 30% to 50%, or from 35% to 45%.

In the starting material, there may suitably be a weight ratio, when considering the dry materials, of fungi/glucan to starch of from 1000:1 to 1:4, or from 500:1 to 1:2, for example from 1000:1 to 1:1, such as from 500:1 to 1:1. In one embodiment, in the starting material, there may suitably be a weight ratio, when considering the dry materials, of fungi/glucan to starch of from 200:1 to 1:1, such as from 200:1 to 5:2 or from 200:1 to 6:1 or from 200:1 to 10:1; in one embodiment the ratio may be from 100:1 to 1:1, such as from 100:1 to 5:2 or from 100:1 to 6:1 or from 100:1 to 10:1. It may be that the ratio is from 75:1 to 1:1 or from 50:1 to 1:1. In one embodiment, there may be a weight ratio, when considering the dry materials, of fungi/glucan to starch of from 100:1 to 3:2, such as from 75:1 to 3:2 or from 50:1 to 3:2. In another embodiment, there may be a weight ratio, when considering the dry materials, of fungi/glucan to starch of from 100:1 to 2:1, such as from 75:1 to 2:1 or from 50:1 to 2:1. In one embodiment, the ratio of dry starch to dry fungi/glucan by weight, is (a) from 1:200 to 1:2.5; or (b) from 1:200 to 1:5; or (c) from 1:200 to 1:10. In another embodiment, there may be a weight ratio, when considering the dry materials, of fungi/glucan to starch of from 25:1 to 1:1, such as from 10:1 to 1:1 or from 5:1 to 1:1, for example from 3:1 to 1:1, or from 2:1 to 1:1.

Dextrin can be sourced from sourced from Atlantis Art Materials. Typically, the dextrin will be added as a dry powder. This may suitably have a moisture content of from 1 to 10% by weight, e.g., from 1 to 5% by weight. Suitable dextrin may be from any source, such as corn (corn dextrin), wheat (wheat dextrin) or potato (potato dextrin).

Without being bound by theory, it is thought that the present invention works by releasing fungal cell wall components, such as glucans, mannans and/or chitins, which bind well to filler materials, especially wood-based filler materials. The alkaline agent interacts with the fungi to lyse the fungi cell walls. This process is exothermic. It is thought that both the chemical action of the alkaline agent and the heat produced by the interaction of the fungi with alkaline agent aid the hydrolysis of the fungi cell walls. It is believed that the fungi cell walls are shrunk and opened by this process, allowing their structure to become unbound. Glucan, mannan and/or chitin layer polysaccharides are thought to be liberated in this process. The fungi may be provided in any suitable form. In one embodiment, the fungi may be provided in a form that comprises at least the fungi cell walls (e.g., yeast cell walls). The fungi may be provided as powdered, ground or chopped mushrooms or may be yeast in the form of industrial baker's yeast, low grade animal feed yeast, or a by-product of brewer's yeast.

In all aspects of the invention, a starting material comprising (A) fungi or glucan and (B) starch and the aqueous solvent system may optionally be provided in the form of an aqueous mixture. Therefore the (A) fungi or glucan and/or (B) starch may, in one embodiment, be provided in a form where it is mixed with an aqueous solvent system.

By definition, the aqueous solvent system comprises water. Preferably the aqueous solvent system comprises water and an organic solvent. It has been found that at least some water is required in the solvent system to ensure that the fungi/glucan can be suspended. Anhydrous acetone, methanol or ethanol does not suspend the fungi/glucan. However, it has also been found that using an organic solvent in addition to water means that the amount of water used can be reduced. Because organic solvents can be easier to remove from a mixture than water, the use of organic solvent can facilitate the drying of the binder.

The aqueous solvent system may have a water content of 10 vol % or more, such as 20 vol % or more, or preferably 30 vol % or more, such as 40 vol % or more, or 50 vol % or more, or even 100 vol %. The aqueous solvent system may have a water content of 90 vol % or less, such as 80 vol % or less, or preferably 70 vol % or less, such as 60 vol % or less. The aqueous solvent system may have a water content of from 10 to 100 volt %, or from 10 vol % to 90 vol %, such as from 20 vol % to 80 vol %, e.g., from 30 vol % to 70 vol %, or from 30 to 60 vol %. In one embodiment the aqueous solvent system has a water content of 10 to 60 vol %, such as from 10 to 55 vol % or from 10 to 50 vol %. In one embodiment the aqueous solvent system has a water content of 20 to 60 vol %, such as from 20 to 55 vol % or from 20 to 50 vol %. In one embodiment the aqueous solvent system has a water content of 30 to 60 vol %, such as from 30 to 55 vol % or from 30 to 50 vol %. In one embodiment the aqueous solvent system has a water content of 40 to 60 vol %, such as from 45 to 55 vol % or from 40 to 50 vol %.

As such, in all aspects of the invention, the starting material comprising (A) fungi or glucan and (B) starch and the aqueous solvent system is may be provided in the form of an aqueous mixture. In one embodiment, the aqueous mixture has a total solvent content of from 45 to 90 wt %, such as from 50 to 80 wt % or from 50 to 70 wt %. In other words, the dry content (the content that is not solvent) of the starting material before the alkali and acid treatment may suitably be from 10% to 55%, by weight, such as from 20% to 55% by weight, or from 20 to 50% by weight, or from 35% to 50% by weight, or from 30% to 50% by weight.

Whilst tap water has been employed to produce the materials of the present invention in the Examples, the skilled person will understand that any grade of water may suitably be used for the present invention. For example, deionised water or distilled water may be used. Water with a low or a high salt concentration, such as hard water or soft water, may be used.

The organic solvent may form an azeotropic mixture with water, thereby aiding the removal of water from the binder.

Preferably the organic solvent has a boiling point of 100° C. or less, such as 80° C. or less, for example from 40° C. to 80° C.; preferably 70° C. or less, for example from 40° C. to 70° C., or from 45° C. to 65° C.

Preferably the organic solvent has a boiling point of 100° C. or less, such as 90° C. or less, so that it is easier to remove from the binder than water. For example, the organic solvent may have a boiling point of such as 80° C. or less, preferably 70° C. or less, for example from 40° C. to 70° C., or from 45° C. to 68° C., or from 50° C. to 65° C. Acetone has a boiling point of 56° C., methanol has a boiling point of 65° C., ethanol has a boiling point of 79° C., 1-propanol has a boiling point of 97° C., 2-propanol has a boiling point of 82° C., 1,4-dioxane has a boiling point of 101° C., tetrahydrofuran has a boiling point of 66° C., and acetonitrile has a boiling point of 82° C.

The organic solvent may be selected from the group of acetone, butanone, methanol, ethanol, 1-propanol, 2-propanol, diethyl ether, methyl acetate, ethyl acetate, toluene, 1,4-dioxane, tetrahydrofuran, acetonitrile, and methylene chloride, and mixtures thereof. In one embodiment the organic solvent is selected from acetone, methanol and mixtures thereof.

In one embodiment the organic solvent has a density of 1 g/mL or less.

In one embodiment the organic solvent is produced by a biological process, for example it may be a bio-alcohol. Examples of suitable bio-derived solvents include methanol, ethanol and acetone. For example the mixture of alcohols may be produced by bioconversion of organic material, providing an alternative use for mixed alcohol fuels. Such processes for producing mixed alcohols have been documented in the literature, for example in Bain et al., Industrial & Engineering Chemistry Research 2014 53 (6), 2204-2218, DOI: 10.1021/ie403631h.

In one embodiment the organic solvent comprises a mixture of alcohols having a boiling point of 100° C. or less such as 80° C. or less, for example from 40° C. to 80° C.; preferably 70° C. or less, for example from 40° C. to 70° C., or from 45° C. to 68° C., or from 50° C. to 65° C.

Preferably the organic solvent is water-soluble, for example having a solubility in water at room temperature of 10 g/100 mL or more, such as 20 g/100 mL or more, such as 50 g/100 mL or more. In one embodiment, the organic solvent is miscible with water in any ratio. As such, the organic solvent is preferably selected from acetone, butanone, methanol, ethanol, 1-propanol, 2-propanol, 1,4-dioxane, tetrahydrofuran, and acetonitrile, and mixtures thereof.

The use of acetone or methanol or mixtures thereof as the organic solvent is preferable, because they are low-cost, readily available, have a low environmental impact. Further, the present inventors have found that binders made using these solvents produce engineered wood products with a high modulus of rupture.

Preferably the organic solvent has a low toxicity. Examples of such solvents are acetone or butanone, or mixtures thereof. In one preferred embodiment the organic solvent is acetone.

It can be foreseen that the organic solvent could be a mixture of a major proportion of a preferred solvent (as described above) together with a minor portion of another organic solvent. For example, the organic solvent could be a mixture of a 75 vol % or more (e.g., 90 vol % or more or 95 vol % or more or 99 vol % or more) of a preferred solvent as described above, together with another organic solvent. In this regard the preferred solvent is selected from the list of acetone, butanone, methanol, ethanol, 1-propanol, 2-propanol, 1,4-dioxane, tetrahydrofuran, and acetonitrile, and mixtures thereof; more preferably the preferred solvent is selected from the list of acetone, methanol and mixtures thereof; most preferably the preferred solvent is acetone.

In one embodiment the organic solvent is a mixture of a major proportion of acetone together with a minor portion of another organic solvent selected from: butanone, methanol, ethanol, 1-propanol, 2-propanol, 1,4-dioxane, tetrahydrofuran, and acetonitrile, and mixtures thereof, for example it may be a mixture of a major proportion of acetone together with a minor portion of another organic solvent selected from: butanone, methanol, ethanol and mixtures thereof.

The (A) fungi or glucan and/or (B) starch may optionally be mixed with solvent (which may, for example, be water or a mixture of water and organic solvent) before the alkali and acid treatment. In this regard, solvent may be added to the (A) fungi or glucan and/or (B) starch such that the starting material comprising (A) fungi or glucan and (B) starch, at the point before the alkali and acid treatment is started, has a total solvent content of from 45 to 90 wt %, such as from 50 to 80 wt % or from 50 to 70 wt %.

The process for preparing the binder may suitably be carried out at a temperature of from room temperature up to 90° C., or from room temperature up to 80° C., preferably from room temperature up to 45° C.

According to the preferred first aspect of the present invention, the fungi/glucan is first treated with an alkaline agent, before being treated with an acidic agent. This provides better results than when the acid treatment is carried out first, followed by alkali treatment. However, according to an alternative first aspect of the present invention, the fungi/glucan is first treated with an acidic agent, before being treated with an alkaline agent. What has been shown to be particularly important is that there is both an alkali treatment and an acid treatment, and that the starting material includes starch as well as fungi (or glucan).

The following description will focus on the preferred embodiment where the fungi/glucan is first treated with an alkaline agent, before being treated with an acidic agent, but it will be appreciated that the alkali/acid treatment and associated details can be reversed to provide the alternative first aspect. WO 2018/215742 A1 also provides detail that will assist understanding of the alternative first aspect.

In some embodiments of the present invention relatively strong acid and strong alkali are added to the fungi/glucan and starch starting material, and in relatively high concentrations, to provide a mixture with a minimal amount of solvent, so as to reduce the amount of solvent, such as water, to be removed in the drying stage.

The quantities of alkaline agent and acidic agent used in the method of the first aspect are suitably selected such that the resulting binder precursor and/or rehydrated binder has a pH from 3 to 11, such as from 4 to 10. In one embodiment, the quantities of alkaline agent and acidic agent used in the method of the first aspect are suitably selected such that the resulting binder precursor and/or rehydrated binder has a pH from 5 to 9, e.g., from 5.5 to 8 or from 6 to 8. In other words, the alkaline agent and acidic agent preferably substantially neutralise each other.

In one embodiment it may be that the mixture as used in the method has been produced by mixing fungi/glucan with an alkaline agent to form an alkaline composition; and mixing the alkaline composition with an acidic agent to form a mixture, where the mixture has a pH from 5 to 9.

It is preferable that the alkaline agent is provided as an aqueous solution; this permits good control of its reaction with the fungi. However, it is also possible to provide the alkaline agent in non-aqueous form. In one embodiment the alkaline agent is provided as an aqueous solution with an alkali concentration of from 1% to 80% by weight, such as 1% to 70% by weight, or 1% to 60% by weight, or 2% to 60% by weight, or 2% to 50% by weight, such as from 5 to 45% by weight. In a preferred embodiment, the alkaline agent is provided as an aqueous solution with an alkali concentration of 10% or more, such as 15% or more, or 20% or more, or 40% or more by weight; e.g., from 30% to 70% by weight, or 50% to 70% by weight, or 55% to 65% by weight; or it may be from 10% to 60% by weight, or from 10% to 50% by weight, or from 15% to 45 wt % or from 20% to 40% by weight. In one embodiment, the solvent is water, such as tap water.

The alkaline agent should be strong enough to lyse the fungi cell walls.

It may be that the alkaline agent is provided as an aqueous solution of an alkali which has a pKaH of 8 or more, such as 11 or more, and with the alkali concentration being 10% or more by weight of the alkaline agent. It may be that the acidic agent is provided as an aqueous solution of an acid which has a pKa of 5 or less, such as 4 or less, or 2 or less, and with the acid concentration being 10% or more by weight of the acidic agent.

In one embodiment, the alkali used in the alkaline agent has a pKaH (pKa of its protonated form) of 9 or greater, such as 10 or greater. Preferably, the alkali has a pKaH of 11 or greater, such as 12 or greater, or 13 or greater. Such alkalis have been found to give good results.

As the skilled person will appreciate, pKa values for acids are known in the art. These can also be determined by the Henderson-Hasselbalch equation, which relates pH and pKa to the equilibrium concentrations of dissociated acid [A⁻] and non-dissociated acid [HA] respectively:

$$pH = pKa + \log_{10}([A^-]/[HA]).$$

The pKaH is the pKa of the conjugate acid for the alkali in question. It will be understood that it is normal to measure pKa and pKaH values in water.

The alkaline agent may be ammonium hydroxide. In one embodiment the alkaline agent is an aqueous solution of an alkali metal or alkali earth metal hydroxide, sulfate, carbonate or phosphate. In a preferred embodiment the alkaline agent is an aqueous solution of an alkali metal or an alkali earth metal hydroxide. In a particularly preferred embodiment, the alkaline agent is an aqueous solution of sodium hydroxide, potassium hydroxide, rubidium hydroxide, caesium hydroxide, calcium hydroxide or strontium hydroxide; e.g., it may be an aqueous solution of sodium hydroxide or potassium hydroxide. In the most preferred embodiment, the alkaline agent is an aqueous solution of sodium hydroxide. Sodium hydroxide and potassium hydroxide are both preferred for their solubility, but sodium hydroxide is yet more preferred as it is cheaper, more readily available and reacts less exothermically than potassium hydroxide.

In one embodiment the alkaline composition has a pH of 9 or more, such as from 9 to 14, such as from 10 to 13. Preferably the alkaline composition has a pH of from 11 to 12.

As the skilled reader will appreciate, the pH of a material can be determined using a pH meter (a potentiometric pH meter, which measures the difference in electrical potential between a pH electrode and a reference electrode).

The ratio of alkaline agent to fungi/glucan, by weight, may be from 5:1 to 1:100, or from 4:1 to 1:100, or from 2:1 to 1:100 or from 1:1 to 1:50, such as from 1:1 to 1:30 or from 1:1 to 1:20. In a preferred embodiment it is from 5:1 to 1:20, such as from 4:1 to 1:20 or from 3:1 to 1:20 or from 2:1 to 1:20, for example from 2:1 to 1:15. In another embodiment it is from 5:1 to 1:15, such as from 4:1 to 1:15 or from 3:1 to 1:15 or from 2:1 to 1:15; it may be from 5:1 to 1:10, such as from 4:1 to 1:10 or from 3:1 to 1:10 or from 2:1 to 1:10. In one embodiment it may be from 1:1 to 1:10, e.g., from 1:1 to 1:4, or from 1:1 to 1:3, or from 1:1 to 1:2. Preferably the ratio of alkaline agent to fungi/glucan, by weight, is from 1:2 to 1:15, or from 1:3 to 1:15, such as from 1:4 to 1:15. It may be that the ratio of alkaline agent to fungi/glucan, by weight, is from 1:2 to 1:15, or from 1:3 to 1:10, such as from 1:4 to 1:10. However, in one embodiment the amount of alkaline agent is from 0.5 to 10 times the amount of fungi/glucan, by weight, such as from 3 to 9 times or from 5 to 9 times. The reference to weights in this regard is in relation to the alkaline agent in the form as actually mixed with the fungi/glucan and starch starting material, i.e., it includes the alkali and any solvent (e.g., water) in which the alkali is diluted, but it does not include any solvent (e.g., water) in the fungi/glucan and starch starting material. As noted above, the alkaline agent is preferably provided as alkali in aqueous solution. The amount of fungi/glucan is the dry weight amount as present in the fungi/glucan and starch starting material.

The amount of fungi/glucan (e.g., yeast), by weight, may be equal to or greater than the amount of alkaline agent, such as from 2 to 15 times greater, e.g., from 3 to 10 times greater. In one preferred embodiment, the amount of fungi/glucan is from 0.5 to 25 times the amount of alkaline agent, by weight, such as from 5 to 20 times or from 10 to 15 times greater.

The use of these ratios has been found to give good results in terms of the control of the process and the characteristics of the binder obtained.

The (A) fungi or glucan and (B) starch is mixed with an alkaline agent in the presence of an aqueous solvent system, which contains water. The water content of the mixture of the fungi or glucan, (B) starch and alkaline agent may be from 5 wt % to 95 wt %, such as from 10 wt % to 90 wt %, for example from 20 wt % to 80 wt %, or from 40 wt % to 70 wt %. Preferably the water content of this mixture is from 30% to 70%, such as from 35% to 60%, or from 40% to 50%, or from 50 wt % to 70 wt %.

Typically, the alkaline agent may be in contact with the fungi/glucan and starch for a period of from 1 minute to 3 hours, or from 1 minute to 2 hours, such as from 2 to 90 minutes, for example from 5 minutes to 1 hour or from 10 minutes to 45 minutes. In one embodiment, the alkaline agent is in contact with the fungi/glucan and starch for a period of from 10 to 30 minutes such as 15 to 20 minutes, or from 20 minutes to 2 hours, or from 60 minutes to 2 hours. Preferably, the alkaline agent is in contact with the fungi/glucan and starch for a period of from 2 to 90 minutes, e.g., from 2 to 60 minutes such as from 2 to 30 minutes or from 2 to 15 minutes, e.g., from 5 to 15 minutes. However, longer times are also contemplated, e.g., up to 4 hours or up to 5 hours. In one preferred embodiment, the alkaline agent is in contact with the fungi/glucan and starch for a period of from 1 minute or more, e.g., 2 minutes or more, such as 5 minutes or more.

In general, the alkaline agent should be in contact with the fungi/glucan and starch for a period of time long enough to allow the majority of the fungi/glucan to dissolve or lyse. During this alkaline treatment process vapour emissions may occur. Thus the alkaline agent and fungi/glucan and starch can be left until there is a decrease in the vapour emissions. This can be assessed visually or can be automated. Equally, during the alkaline treatment process heat is generated. Thus the temperature can be monitored and the alkaline agent and fungi/glucan and starch can be left until the temperature starts to return to room temperature. This can be assessed manually with a thermometer or can be automated.

It may be that the alkaline agent is mixed with the fungi/glucan and starch during the full period of time they are in contact, or it may be that some of the contact time is at rest. For example, mixing may occur during from 10 to 100% of the contact time, e.g., from 50 to 100% or from 75% to 100% of the contact time. Thus mixing occurs during some, most or all of the contact time period. Carrying out mixing allows the alkaline agent to efficiently react with the fungi/glucan and starch. The mixing is preferably even and steady.

The mixing of the alkaline agent with the fungi/glucan and starch may be carried out using any suitable mixing apparatus. The skilled person will appreciate that the viscosity of the composition should be taken into account in selecting a suitable apparatus. In one embodiment it is performed with a mechanical mixer, such as a planetary mixer or a pan type mixer or a conical screw mixer. It will be appreciated that the speed of mixing may be selected according to the scale of the process and the type of mixing apparatus. The mixing may, for example, be carried out at a speed in the range of from 10 to 1600 rpm. In one embodiment the mixing is carried out with a mechanical paddle at from 10 to 800 rpm, e.g., from 20 to 700 rpm, such as about 40 to 600 rpm. In another embodiment the mixing is carried out with a mechanical paddle at from 50 to 200 rpm, such as from 80 to 140 rpm, e.g., from 100 to 120 rpm. The present invention is not limited to a particular range of mixing speeds and these are purely exemplary. What is important is that, at the scale involved, the mixing speed is selected so as to produce an even, smooth blending of the product.

The mixing may suitably be carried out at around room temperature, e.g., from 15 to 25° C. For example, in one embodiment there is no external heat added. As noted above, the reaction is exothermic. In another embodiment, the mixing is carried out at above room temperature, i.e., above 15° C., and in particular above 25° C., such as above 25° C. and up to 90° C., or from 30° C. to 70° C., e.g., from 40° C. to 60° C. The mixing may be carried out at from 25° C. to 80° C., or from 30° C. to 90° C., such as from 40° C. to 90° C., or from 50° C. to 80° C., such as from 60° C. to 80° C.

The mixing may suitably be carried out at around atmospheric pressure. For example, in one embodiment there is no external pressure applied.

The alkaline composition is mixed with an acidic agent to form a mixture. Like the alkaline agent, the acidic agent can also interact with the fungi to lyse the fungi cell walls. This process is exothermic.

The acid is thought to cleave the bonds of cell wall components, such as acid-soluble glucans, mannans and/or chitins, which have not been broken down during the alkali phase.

The addition of acid significantly reduces the viscosity of the composition, thereby allowing the mixture to flow out of the reaction vessel. It is believed that this reduction in viscosity is due to the acid breaking down the cell wall components into smaller polysaccharides.

The acidic agent neutralises the alkaline composition, which further releases glucans from the fungi cell walls. The neutralisation is exothermic.

It may be preferable that the acidic agent is provided as an aqueous solution; this permits good control of its reaction with the fungi/glucan. However, the acidic agent may be provided in undiluted form (e.g., weaker acids and/or organic acids may be obtained commercially in non-aqueous form and used directly in this form). In one embodiment the acidic agent is provided as an aqueous solution with a concentration of acid of from 2% to 50% by weight, such as from 5 to 45% by weight. In a preferred embodiment, the acidic agent is provided as an aqueous solution with a concentration of acid of 10% or more, such as 15% or more, or 20% or more, by weight. For example, the acidic agent may be provided as an aqueous solution with a concentration of acid from 10% to 50% by weight, or from 10% to 20% by weight, or from 15% to 45 wt %, or from 20% to 40% by weight. In one embodiment, the acidic agent may be provided as an aqueous solution with a concentration of acid from 5% to 30% by weight, or from 5% to 25% by weight, or from 5% to 20 wt %, e.g., from 10% to 20% or from 10% to 15% by weight In one embodiment, the solvent is water, such as tap water.

It will be understood that the term "acid" refers to Brønsted acids. In one embodiment, the acid in the acidic agent has a pKa of 5 or less, or 4 or less, or 3 or less, or 2 or less. Preferably, the acid has a pKa of 1 or less, such as 0 or less.

In one embodiment the acidic agent is selected from hydrochloric acid, hydrobromic acid, hydroiodic acid, nitric acid, sulfuric acid, phosphoric acid, carbonic acid, citric acid, lactic acid, maleic acid, formic acid, acetic acid, propionic acid, butyric acid, valeric acid, caprolic acid, oxalic acid, malic acid and benzoic acid; each agent may be provided as an aqueous solution or in non-aqueous form. In one embodiment the acidic agent is selected from an aqueous solution of hydrochloric acid, hydrobromic acid, hydroiodic acid, nitric acid, sulfuric acid, phosphoric acid, carbonic acid, citric acid, lactic acid, maleic acid, formic acid, acetic acid, propionic acid, butyric acid, valeric acid, caprolic acid, oxalic acid, malic acid and benzoic acid. Experiments have shown that effective binders can be made from a range of acids in both aqueous and non-aqueous forms.

In one embodiment the acidic agent is selected from hydrochloric acid, sulfuric acid, nitric acid, phosphoric acid, carbonic acid, citric acid, lactic acid, formic acid and acetic acid, e.g., hydrochloric acid, sulfuric acid, phosphoric acid or nitric acid; each agent may be provided as an aqueous solution or in non-aqueous form. In a preferred embodiment, the acidic agent is selected from an aqueous solution of hydrochloric acid, carbonic acid and citric acid. In a more preferred embodiment, the acidic agent is an aqueous solution of hydrochloric acid.

The ratio of acidic agent to fungi/glucan, by weight, may be from 5:1 to 1:15, such as from 4:1 to 1:15 or from 3:1 to 1:15 or from 2:1 to 1:15 or from 1:1 to 1:15. In one embodiment the ratio of acidic agent to fungi/glucan, by weight, may be from 5:1 to 1:10, such as from 4:1 to 1:10 or from 3:1 to 1:10 or from 2:1 to 1:10 or from 1:1 to 1:10. It may be that the ratio is from 4:1 to 1:6, e.g., from 4:1 to 1:4, or from 3:1 to 1:3, such as from 2:1 to 1:2. In one embodiment the ratio of acidic agent to fungi/glucan, by weight, is from 1:2 to 1:9, for example from 1:3 to 1:7, or from 1:5 to 1:7 such as about 1:5. In one embodiment the amount of acidic agent is from 0.5 to 10 times the amount of fungi/glucan, by weight, such as from 2 to 7 times, or from 4 to 7 times. The reference to weights in this regard is in relation to the acidic agent in the form as actually mixed with the fungi/glucan and starch starting material, i.e., it includes the acid and any solvent (e.g., water) in which the acid is diluted, but it does not include any solvent (e.g., water) in the fungi/glucan and starch starting material. As noted above, the acidic agent may be provided as acid in aqueous solution. The amount of fungi/glucan is the dry weight amount as present in the fungi/glucan and starch starting material.

The use of these amounts of acidic agent and fungi/glucan has been found to give good results in terms of the control of the process and the characteristics of the binder obtained.

Typically, the acidic agent may be in contact with the fungi/glucan for a period of from 1 minute to 2 hours, or from 2 minutes to 30 minutes, for example from 5 minutes to 20 minutes, or from 5 minutes to 1 hour, or from 10 minutes to 1 hour, or from 10 minutes to 45 minutes. In one embodiment, the acidic agent is in contact with the fungi/glucan for a period of from 10 to 30 minutes, such as 15 to 20 minutes. Preferably, the acidic agent is in contact with the fungi/glucan for a period of from 1 to 60 minutes to allow for even blending of the acid into the paste. In one embodiment, the acidic agent is in contact with the fungi/glucan for a period of 1 minute or more, or 2 minutes or more, or 5 minutes or more. In one embodiment, the acidic agent is in contact with the fungi/glucan for a period of 1 hour to 2 hours. However, longer times are also contemplated, e.g., up to 4 hours.

The acidic agent should preferably be in contact with the alkali-treated fungi/glucan for a period long enough to ensure substantial neutralisation throughout the composition.

As noted above, during the reaction heat is generated. Thus the temperature can be monitored and the acidic agent and fungi/glucan can be left to react until the temperature starts to return to room temperature. This can be assessed manually with a thermometer or can be automated.

It may be that the acidic agent is mixed with the fungi/glucan during the full period of time they are in contact, or it may be that some of the contact time is at rest. For example, mixing may occur during from 10 to 100% of the contact time, e.g., from 50 to 100% or from 75% to 100% of the contact time. Thus mixing occurs during some, most or all of the contact time period.

Carrying out mixing allows the acidic agent to efficiently react with the fungi/glucan. The mixing is preferably even and steady.

The mixing of the acidic agent with the fungi/glucan may be carried out using any suitable mixing apparatus. The skilled person will appreciate that the viscosity of the composition should be taken into account in selecting a suitable apparatus. In one embodiment it is performed with a mechanical mixer, such as a planetary mixer or a pan type mixer or a conical screw mixer. It will be appreciated that the speed of mixing may be selected according to the scale of the process and the type of mixing apparatus. The mixing may, for example, be carried out at a speed in the range of from 10 to 1600 rpm. In one embodiment the mixing is carried out with a mechanical paddle at from 10 to 800 rpm, e.g., from 20 to 700 rpm, such as about 40 to 600 rpm. In another embodiment the mixing is carried out with a mechanical paddle at from 50 to 200 rpm, such as from 80 to 140 rpm, e.g., from 100 to 120 rpm. The present invention is not limited to a particular range of mixing speeds and these are purely exemplary. What is important is that, at the scale involved, the mixing speed is selected so as to produce an even, smooth blending of the product.

The mixing may suitably be carried out at around room temperature, e.g., from 15 to 25° C. For example, in one embodiment there is no external heat added. As noted above, the reaction is exothermic. The hotter the temperature of the preparation of the mixture, typically the weaker the resulting products, e.g., boards, are. In one embodiment the mixture is prepared at a temperature of from 10° C. to 80° C., such as from 15 to 60° C., but preferably from 15° C. to 45° C., such as from 15 to 40° C., and more preferably at around room temperature, e.g., from 15 to 25° C. The mixing may be carried out at from 25° C. to 80° C., or from 30° C. to 90° C., such as from 40° C. to 90° C., or from 50° C. to 80° C., such as from 60° C. to 80° C.

The mixing may suitably be carried out at around atmospheric pressure. For example, in one embodiment there is no external pressure applied.

It has been determined that the resulting pH of the mixture does not significantly impact on the strength of the articles made from the resultant binder precursor/rehydrated binder. However, a mixture, and thus a binder precursor and/or a rehydrated binder, of a certain pH can be preferable for other reasons, such as to prevent corrosion of the user's hands, the equipment and/or the filler material.

It has been suggested that the pH of the mixture will correspond with the pH of the rehydrated binder, assuming that the amount of water used to rehydrate the binder precursor is similar to the amount of solvent removed, in the drying step, from the mixture. Therefore, the pH of the mixture may be controlled in order to control the pH of the binder precursor and/or of the rehydrated binder.

The pH of the mixture can be selected to avoid damaging the filler material (e.g., wood) and to create a good cohesion with co-binding resins (e.g., crosslinkers) in the product.

In some cases the pH of the mixture will change slightly after being left to stand. Therefore, the pH of the mixture may be measured four hours (or more) after its manufacture.

In one embodiment the mixture may have a pH of from 1 to 14, such as from 5 to 14, or from 5 to 12. In one embodiment the mixture may have a pH of from 4 to 9, or from 5 to 9, such as from 5.5 to 9, such as from 6 to 9, or from 7 to 9. For example, the mixture may have a pH of from 5 to 8.5, such as from 5 to 8, or from 5 to 7.5, or from 5 to 7. It may be that the pH is from 5.5 to 8.5, such as from 5.5 to 8, or from 5.5 to 7.5, or from 5.5 to 7. In one embodiment the pH of the mixture will be from 6 to 8, or from 6.5 to 8, such as about 7.

It has been noted that binders that have a pH value approximately matching the pH value of wood can be easier to mix with wood-based fillers than binders of more alkaline pH. In one embodiment the mixture may have a pH of from 3 to 10, or from 3 to 7, or from 3 to 6.5. It may be preferable that the alkaline agent and acidic agent are added in quantities that produce a mixture that is acidic, such as having a pH of from 3 to 6, to match the approximate pH of wood.

The mixture will likely be aqueous, i.e., it will be likely to contain water. It may contain about 60% solvent, such as water, content by weight, but most or all of this weight will not be present in the binder precursor.

When considering the alkaline agent and acidic agent, the molar ratio of acid to alkali may be from 5:1 to 1:30, such as from 4:1 to 1:30, or 3:1 to 1:30, or 2:1 to 1:30; e.g., from 5:1 to 1:10, such as from 4:1 to 1:10, or 3:1 to 1:10, or 2:1 to 1:10. In one embodiment, it is from 1:1 to 1:30, such as from 1:1 to 1:20, or from 1:1 to 1:10, or from 1:1 to 1:8, or from 1:1 to 1:6. In one embodiment the molar ratio of acid to alkali may be selected such that the acid and alkali substantially neutralise each other. In one embodiment the molar ratio of acid to alkali is from 1:1.5 to 1.5:1, such as from 1:1.4 to 1.4:1, or from 1:1.3 to 1.3:1. In one embodiment, the molar ratio of acid to alkali is from 1:1.2 to 1.2:1, such as from 1:1.1 to 1.1:1. Thus it may be that the number of moles of acid is substantially equal to the number of moles of alkali.

The skilled person will understand that the calculation of molar ratios must take into account the number of moles of acidic protons that are liberated from the acidic species and the number of moles of alkaline sites of the alkaline species, in accordance with the normal (N) unit. Therefore any such calculations must take into account whether the acid is monoprotic or diprotic, for example.

In one embodiment the alkaline agent is provided as an aqueous solution of an alkali which has a pKaH of 12 or more, e.g., 13 or more, and with the alkali concentration being 10% or more (e.g., 15% or more, such as from 15 to 50%, or 20% or more, such as from 20 to 45%) by weight of the alkaline agent, and wherein the acidic agent is provided as an aqueous solution of an acid which has a pKa of 1 or less, e.g., 0 or less, and with the acid concentration being 10% or more (e.g., 15% or more, such as from 15 to 50%, or 20% or more, such as from 20 to 45%) by weight of the acidic agent.

By carrying out this process of combining fungi/glucan with alkaline agent and acidic agent, a useful binder precursor and related rehydrated binder can be obtained. Without being bound by theory, the strong binding ability of these products is thought to be obtained due to re-linking (via covalent bonds and/or hydrogen bonds) of hydrolysed material from the fungi cells/glucan, which occurs under broadly neutral conditions.

The fungi/glucan is preferably treated with alkaline agent and then with acidic agent. It has been found that treatment in this order of treatment helps the cells to be broken down and then be exposed to substantially neutral conditions, giving the most advantageously strong binding characteristics in the resulting binder. However, in an alternative embodiment the fungi/glucan is treated with acidic agent and then with alkaline agent. This is still effective.

The binder precursor and/or rehydrated binder according to the present invention may be prepared without any separation or extraction steps, such as filtration or centrifugation, except for the drying step. This means that the production of the binder precursor and/or rehydrated binder is simple, efficient and cost-effective. Once the binder precursor is rehydrated, the rehydrated binder can be used directly, e.g., being directly combined with the filler material.

Therefore the binder precursor and/or rehydrated binder can be prepared by a process that involves the combination of a number of materials but, except for the drying step, does not require any products to be removed. There are no unwanted by-products.

Indeed, in one preferred embodiment, the solvent removed when the mixture is dried is recycled. For example, the aqueous solvent system may comprise solvent removed during the drying of the mixture. Recycling the solvent has the benefit of reducing the environmental impact of the manufacture of the binder precursor. The solvent may be removed, collected and recycled using a flash dryer, such as a Hosokawa Drymeister® (DMR-H) or a rotary evaporator, such as a Buchi Rotavapor® R-250 EX.

Being able to produce a dried binder precursor (e.g., in powdered form) allows the binder to be more easily transported and increases the stability of the binder under long-term storage. Therefore, according to the present invention, the mixture is dried. The mixture may be formed into a powder.

The skilled person will appreciate that the mixture may be dried, i.e., solvents may be removed from the mixture, under atmospheric conditions (i.e., atmospheric pressure and temperature). However, subjecting the mixture to a temperature higher than atmospheric temperature and/or a pressure lower than atmospheric pressure will increase the rate at which the mixture dries.

Preferably the mixture is dried by heating the mixture. The mixture may be heated at a temperature of 30° C. or more, or 40° C. or more to dry the mixture. The use of a higher temperature will increase the rate at which the mixture dries but will be more expensive and may denature the components within the mixture, thereby reducing the binding efficacy of the mixture. Therefore, the mixture may suitably be heated at a temperature of 300° C. or less, such as 250° C. or less, or 200° C. or less, or 150° C. or less, such as 100° C. or less, more preferably 80° C. or less or 70° C. or less or 60° C. or less, to dry it. For example, the mixture may be heated at a temperature of from 30° C. to 300° C., such as from 50° C. to 250° C., or 100° C. to 200° C., or 30° C. to 150° C., or 30° C. to 100° C., or 30° C. to 80° C., or 30° C. to 70° C., in order to dry it. The mixture may be heated at a temperature of from 35° C. to 65° C. or from 40° C. to 60° C. to dry it.

The mixture may be dried by applying a negative pressure to it. The mixture may be subjected to a pressure of 800 mbar or less, such as 500 mbar or less, or 250 mbar or less, or 100 mbar or less to dry it. Whilst a more negative pressure will be unlikely to denature the components within the mixture, it may be more expensive to use extremely low pressures. Therefore, the mixture may be subjected to a pressure of 0.1 mbar or more, such as 1 mbar or more, or 10 mbar or more, in order to dry it. For example, the mixture may be subjected to a pressure of from 0.1 mbar to 800 mbar, such as from 1 mbar to 500 mbar, or from 10 mbar to 250 mbar, or from 10 mbar to 100 mbar in order to dry it.

The skilled person will be aware of various types of equipment that may be used to apply heat and/or a negative pressure to the mixture in order to dry it. For example, the mixture may be dried on a hotplate, in an oven (such as a vacuum oven), using a flash drier, or using a rotary evaporator.

In one embodiment an industrial continuous centrifugal system can be used to reduce the water content or partially dry the binder, followed by further heating or dehydration. This may be optimal in terms of energy savings and time.

The mixture may be freeze-dried to remove solvents, such as water. Removing solvents using freeze-drying typically involves cooling the sample (i.e., the mixture) and subjecting the sample to a negative pressure, such that the solvent sublimes. The triple point of water is at about 0.01° C. and about 6.1 mbar. Therefore, the mixture may be cooled to a temperature of 0.01° C. or less, such as −20° C. or less, and a kept at a pressure of 6.1 mbar or less, such as 1 mbar or less. The mixture may be freeze-dried using commercially available freeze-drying apparatus or using conventional cooling and vacuum apparatus, so as to dry it.

It will be understood that the time that it takes to dry the mixture will depend upon the conditions used and the amount of mixture that is to be dried. For example, the mixture may be dried for 30 minutes or more, such as 1 hour or more or 2 hours or more.

In one embodiment, the mixture is dried by a process that involves both heat and pressure. In particular, the drying process may cure the mixture and form a hardened cured binder product. This may then be ground and made into a powder.

In one embodiment, step iii) comprises a) drying the mixture so as to form a dry composition; and b) forming a powder from the dry composition, so as to form the powdered binder precursor.

The dry composition and/or binder precursor does not have to be completely free of solvent. For example, the dry composition and/or binder precursor may contain 10 wt % solvent or less, or 5 wt % solvent or less, such as 2 wt % solvent or less. Preferably the dry composition and/or binder precursor contains 1 wt % solvent or less, or even 0.5 wt % solvent or less. The dry composition should be dry enough to form a free-flowing powder. The binder precursor should be dry enough to be a free-flowing powder.

The dry composition is formed into a powder to produce a powdered binder precursor. The skilled person will be aware of many methods of forming powder from a dry composition. For example, the dry composition may be formed into a powder using a ball mill, a burr grinder, or a blade grinder, such as a Henry Charles Manual Grinder, available from Amazon UK.

The particles of the binder precursor may be approximately spherical. The particles may have a maximum diameter of 1 mm or less, such as 0.1 mm or less, in any dimension. The maximum size of the powder particles may be determined by sieving.

As a frame of reference, the binder precursor may be contrasted with the mixture as obtained in step ii) of the method of the first aspect.

The binder precursor shows better long-term storage stability than the mixture. For example, the binder precursor may remain mould-free for longer than the mixture.

The binder precursor weighs less than the mixture because it contains significantly less solvent than the mixture. As the binder precursor is lighter than a comparably effective amount of the mixture, a lower weight and/or volume of material needs to be transported.

Transportation costs depend, at least in part, on the weight of the material being transported. The reduced weight of the binder precursor compared to the mixture means that it will be cheaper to transport the binder precursor than to transport an equivalently effective amount of the mixture.

Furthermore, the reduction in the weight of material being transported means that less carbon dioxide will be produced if the binder precursor, rather than the mixture, is transported. This also means that the carbon footprint of the binder is reduced.

The binder precursor can be mixed with water, thereby forming a rehydrated binder.

In one embodiment, in the methods of the eighth, ninth, tenth and/or eleventh aspects, in step a) the rehydrated binder is produced in situ. Thus in step a) the rehydrated binder may be produced by providing a binder precursor according to the second aspect; and mixing the binder precursor with water so as to form the rehydrated binder.

The rehydrated binder may have a water content of 10 wt % or more, such as 20 wt % or more, or preferably 30 wt % or more, such as 40 wt % or more, or even 100 wt %. The rehydrated binder may have a water content of 90 wt % or less, such as 80 wt % or less, or preferably 70 wt % or less, such as 60 wt % or less. The rehydrated binder may have a water content of from 10 wt % to 90 wt %, such as from 20 wt % to 80 wt %, preferably from 30 wt % to 70 wt %, such as from 40 wt % to 60 wt %.

A benefit of the present invention is that the end user can control how much water is added to the binder precursor to form the rehydrated binder. Therefore there is the ability to choose the water level based on factors such as how quickly the binder needs to cure and how viscous the binder needs to be.

One or more additional solvent may be added to the binder precursor, in addition to the water. The solvent may, for example, be an organic solvent. The organic solvent may be selected from the group of acetone, butanone, methanol, ethanol, 1-propanol, 2-propanol, diethyl ether, methyl acetate, ethyl acetate, toluene, acetonitrile, 1,4-dioxane, tetrahydrofuran, and methylene chloride. Preferably the organic solvent is water-soluble, for example having a solubility in water of 10 g/100 mL or more, such as 20 g/100 mL or more, such as 50 g/100 mL or more. In one embodiment, the organic solvent is miscible with water in any ratio. As such, the organic solvent is preferably selected from the list of acetone, butanone, methanol, ethanol, 1-propanol, 2-propanol, 1,4-dioxane, tetrahydrofuran, and acetonitrile. The use of acetone or methanol as the organic solvent is preferable as they are low cost, readily available and have a low environmental impact. Preferably the organic solvent has a low toxicity. As such, the organic solvent is preferably acetone or butanone—most preferably acetone.

The organic solvent may form an azeotropic mixture with water, thereby aiding the removal of water from the binder during curing. Preferably the organic solvent has a boiling point of less than 100° C. so that it is easier to remove from the binder than water. For example, the organic solvent may have a boiling point of 90° C. or less, such as 80° C. or less, or 70° C. or less. In one embodiment the organic solvent has a density of 1 g/mL or less.

Control of the total amount of solvent, including water, within the rehydrated binder is beneficial, since if the rehydrated binder has too much solvent then it will require a long curing time; however, too little solvent may mean that the rehydrated binder is too viscous to evenly mix with filler material.

In one embodiment, the binder precursor is mixed with 30 wt % or more of solvent, preferably 50 wt % or more, or 60% or more of solvent. The binder precursor may be mixed with 300 wt % or less of solvent, such as 200 wt % or less, or 150 wt % or less of solvent. For example, the binder precursor may be mixed with from 30 wt % to 300 wt % of solvent, such as from 50 wt % to 200 wt % of solvent. Preferably the binder precursor is mixed with from 60 wt % to 150 wt % of solvent. As such, the rehydrated binder may have a solvent content of from 20 to 80 wt %, such as from 30 to 70 wt % or from 35 to 55 wt %. In other words, the dry content (the content that is not solvent) of the rehydrated binder may suitably be from 20% to 80%, by weight, such as from 30% to 70% by weight, or from 45 to 65% by weight.

The rehydrated binder as prepared may have advantageous properties in terms of its viscosity. The rehydrated binder as formed may be a fluid paste with viscosity of less than 3000 centipoise.

The viscosity of a binder is important to allow for it to be easily mixed with filler material. In particular, the viscosity of a binder has to be sufficiently low so that it can be successfully mixed with filler material. A viscosity of 3000 centipoise or less allows the rehydrated binder to easily mix with the filler material. In one embodiment, the viscosity of the rehydrated binder of the present invention is from 100 to 3000 centipoise, such as from 100 to 2000 centipoise or from 100 to 1000 centipoise or from 100 to 750 centipoise. It may be that the viscosity is from 200 to 1000 centipoise, such as from 200 to 750 centipoise or from 200 to 700 centipoise. Preferably, the viscosity of the rehydrated binder is 600 centipoise or less, such as from 200 to 600 centipoise, and most preferably from 200 to 500 centipoise.

For the rehydrated binder of the present invention, a viscosity of from 400 to 500 centipoise typically corresponds to a dry material content in the binder of 30-40% by weight. This ability to have a low viscosity with a relatively high content of dry material is a technical benefit of the present invention. Prior art binders normally require a lower dry material content (i.e., higher water content) to achieve a low viscosity.

Whilst the viscosity of the rehydrated binder can be further reduced by adding more of a diluent, i.e., a solvent, such as water, doing so will typically lengthen the curing time of the rehydrated binder due to the increased amount of water that will need to be removed during curing.

Viscosity can also be reduced by adding a cross-linking agent or a co-binding agent. It may be that from 1 to 40%, or from 2 to 40% of a cross-linking agent and/or a co-binding agent is added, such as from 2 to 30%, or from 3 to 20%, or more preferably from 5% to 15% by weight relative to the total weight of the rehydrated binder.

The pH of the rehydrated binder can be selected to avoid damaging the filler material (e.g., wood) and to create a good cohesion with co-binding resins (e.g., crosslinkers) in the product.

In some cases the pH of the rehydrated binder will change slightly after being left to stand. Therefore, the pH of the rehydrated binder may be measured four hours (or more) after its manufacture.

The pH of the rehydrated binder may be controlled by: a) controlling the pH of the mixture; b) controlling the amount of solvent used to rehydrate the binder precursor; and/or c) including a pH-modifying additive, such as an acid and/or a base, in the rehydrated binder.

In one embodiment the rehydrated binder may have a pH of from 1 to 14, such as from 5 to 14, or from 5 to 12. In one embodiment the rehydrated binder may have a pH of from 4 to 9, or from 5 to 9, such as from 5.5 to 9, such as from 6 to 9, or from 7 to 9. For example, the rehydrated binder may have a pH of from 5 to 8.5, such as from 5 to 8, or from 5 to 7.5, or from 5 to 7. It may be that the pH is from 5.5 to 8.5, such as from 5.5 to 8, or from 5.5 to 7.5, or from 5.5 to 7. In one embodiment the pH of the rehydrated binder will be from 6 to 8, or from 6.5 to 8, such as about 7.

It has been noted that binders that have a pH value approximately matching the pH value of wood can be easier to mix with wood-based fillers than binders of more alkaline pH. It may be preferable that the binder precursor and/or rehydrated binder is acidic, such as having a pH of from 3 to 6, to match the approximate pH of wood. In one embodiment the binder precursor and/or rehydrated binder may have a pH of from 3 to 10, or from 3 to 7, or from 3 to 6.5.

The binder precursor and/or rehydrated binder of the present invention is suitably non-toxic in the form when used. In particular, the binder precursor and/or rehydrated binder of the present invention is substantially free of formaldehyde emissions, thereby meeting the safety, environmental and regulatory demands on the engineered wood industry.

The binder precursor and/or rehydrated binder can be shaped and cured to form a strong three dimensional shaped article. Such an article has excellent mechanical properties.

The shaped article comprises filler material dispersed through cured binder.

In the method of the third aspect and of the eighth aspect, where a filler material is mixed with the binder precursor and/or rehydrated binder in step b), the composition may be shaped into a three-dimensional shape, which is the desired shape of the shaped article, during or after the step of mixing the binder precursor and/or rehydrated binder with the filler material.

In one such embodiment, moulding is used. It may be that a pre-mixed composition of binder precursor and/or rehydrated binder and filler material is placed into a mould for shaping and then is allowed to cure, or it may be that the binder precursor and/or rehydrated binder and filler material are mixed in the mould to form a shape and then this is allowed to cure.

The filler material is any material able to be dispersed in and bound by the binder precursor and/or rehydrated binder. It is important to note that in the context of the present invention this broad definition of the term "filler material" is intended.

The filler material may comprise pieces that can be dispersed through the binder precursor and/or rehydrated binder. The filler material may, for example, be particulate or granular or fibrous. It may in one embodiment be chopped, shredded or ground material.

The filler material is preferably sustainably sourced. It is preferably non-toxic. It may usefully be a natural material.

The filler material may comprise lignocellulose. In a preferred embodiment, the filler material comprises, or is, a wood-based filler, such as wood chips, saw dust, wood fibres and/or wood shavings.

A filler that includes lignocellulose, such as a wood-based filler material, is preferred, because it is believed that the cellulose in wood interacts with the binder precursor and/or rehydrated binder and this improves the strength of the end product.

Preferably, the filler material is in the form of strands, fibres or chips. More preferably the filler material is in the form of strands, fibres or chips of wood.

It may be that the binder precursor and/or rehydrated binder is mixed with the filler material to form a substantially homogenous blended composition. Therefore the filler material may be substantially evenly distributed throughout the binder precursor and/or rehydrated binder before curing. In an alternative embodiment, the filler may be distributed non-evenly, for example there may be a denser concentration of filler at the top or at the bottom or in the middle, or the filler may comprise different size pieces and the larger size pieces may be concentrated at one location, e.g., towards the middle.

In general, in the invention one or more additives may optionally be added to the mixture before drying and/or forming the powder, to the binder precursor and/or rehydrated binder before curing. In one embodiment, one or more additives are added when the binder precursor is mixed with the water. In a preferred embodiment a cross-linker is added immediately before or during the mixing of the binder precursor with the water. In one embodiment one or more additives are added when the binder precursor and/or rehydrated binder is mixed with the filler material. In a preferred embodiment a cross-linker is added immediately before or during the mixing of the binder precursor and/or rehydrated binder with the filler material. The binder precursor and/or rehydrated binder preferably comprises a crosslinking agent, such as polyamidoamine epichlorohydrin (PAE), in an amount of up to 40% by weight.

The binder precursor and/or rehydrated binder can usefully be combined with filler material before or during curing. The filler may be any material that can be dispersed in and bound by the binder precursor and/or rehydrated binder. The binder precursor and rehydrated binder have each been found to be excellent at binding filler materials, in particular wood-based filler materials, to form cured three-dimensional articles having the filler material dispersed throughout.

In the method of the third aspect and the method of the eighth aspect, the shaping is carried out by use of a mould, e.g., by press moulding. Therefore, for example, the shaping may comprise shaping the composition into a panel, sheet or tile shape.

The above discussions and optional features relating to the method of the third aspect and the method of the eighth aspect apply, mutatis mutandis, to the method of the sixteenth aspect and the method of the twenty-first aspect.

The articles of the present invention may be resilient and strong, for example, in terms of their resistance to forces such as compression or in terms of its durability. The skilled person will appreciate that the herein described properties and benefits described in relation to the articles of the present invention are also applicable to or attained by the composite products of the present invention.

Binders related to the present invention have been found to contain no formaldehyde. Therefore, the binder precursors and/or rehydrated binders of the present invention can be employed as formaldehyde-free alternatives to urea-formaldehyde resins used in the engineered wood industry. Thus the binder precursors and/or rehydrated binders of the present invention can be used to bind together wood-based filler material to form shaped articles which are composite wood products, such as particle boards, plywood and medium-density fibreboards (MDFs).

In addition, by using filler material that is from sustainable sources, the article of the invention is obtainable from sustainable sources. The filler material may usefully be chosen as a natural material, but synthetic materials may also be contemplated.

Thus the present invention permits the production of a strong and resilient article that can be utilised for construction, packaging and the like, but which is a "green" product in the sense that it is non-toxic and it uses natural and sustainable raw materials.

The binder precursor and/or rehydrated binder of the invention may be used in combination with known binders, as co-resins. When the binder precursor and/or rehydrated binder is used in combination with a co-resin, the co-resin may be used, i.e., included in the binder precursor or rehydrated binder, in an amount of up to 60% by weight of the combined binder precursor or rehydrated binder plus co-resin, e.g., from 0.5 to 50% or from 1 to 40% or from 5 to 30%. It may be that the co-resin is selected from the group consisting of urea-formaldehyde, melamine-formaldehyde, and pMDI.

Due to the fact that the present binder precursors and rehydrated binders have excellent properties, especially in terms of strength, the amount of known binder, e, g. urea formaldehyde, can be reduced as compared to what is conventional. Therefore even when used in combination with less environmentally friendly binders, the net effect is a reduction in negatives, e.g., a reduction in the amount of formaldehyde emitted. In one embodiment the binder precursor and/or rehydrated binder of the invention is used in combination with one or more co-resins, e.g., urea formaldehyde, in a weight ratio of from 100:1 to 1:2, such as from 50:1 to 1:1, e.g., from 50:1 to 2:1.

The articles of the present invention may be durable for a period of six months or more, such as five years, before degrading. The article may have a longer durability indoors than outdoors.

The articles of the present invention may, in one embodiment, find use as non-toxic, sustainably sourced alternatives to engineered wood panels. In particular, it is envisaged that the articles may be suitable replacements for conventional fibreboards (such as high-density, medium-density or low-density fibreboards), insulation boards, particle boards, oriented strand board (OSB) or plywood. Thus the articles may, in one embodiment, be in the form of panels, sheets or tiles.

In one embodiment, the article may be a temporary or permanent construction material, such as flooring, roofing or wall panelling.

The article may, for example, be shaped in the form of a flooring tile. The flooring tile my have any shape but in one embodiment they may be square or rectangular or hexagonal. These tiles may be formed into an array, which may be substantially planar. In one embodiment the tiles are temporarily or permanently linked together in the array form to provide a flooring structure. This flooring structure may be laid down for outdoor events, such as festivals or markets or weddings. This flooring structure can therefore serve to protect the underlying land and/or to provide a flat and even surface and/or to provide a clean and dry surface.

The article may also be used in the packaging industry. In this regard, the article may be shaped in the form of a crate, box or tray. For example, the article may be a moulded tray which can be used to hold food-stock, such as fruit or vegetables, e.g., during transportation and/or display. The present invention is especially beneficial in this application due to the article being non-toxic and being formed from cheap, readily available and sustainable raw materials.

One or more filler material is combined with the binder precursor and/or rehydrated binder to form a composition that is cured to obtain the article according to the invention. The binder precursor and/or rehydrated binder may be combined with a filler material by hand or using a blending machine, such as a planetary mixer, a rotating drum mixer, or a roller (particularly when viscosity is high, and for surface applications). The rehydrated binder may be sprayed onto the filler material, which will improve the spreading over the filler material, and which is particularly suitable if the rehydrated binder is of a low viscosity, such as 500 cP or less, preferably 300 cP or less, such as from 300 cP to 100 cP.

It will be understood that the amount of binder precursor and/or rehydrated binder mixed with the filler material will depend on the nature of the filler material and both the intended use and desired properties of the article. For particle boards or fibreboards, the binder precursor and/or rehydrated binder will typically make up from 5 to 15% of the composition by weight on a dry weight basis. For plywood, the binder precursor and/or rehydrated binder will typically be used in an amount of from 100 to 300 g/m$^2$, such as from 140 to 250 g/m$^2$ for each surface that the binder precursor and/or rehydrated binder is applied to. In one embodiment, the binder precursor and/or rehydrated binder makes up 1% or more of the composition or 5% or more of the composition or 10% or more of the composition, e.g., from 5 to 90% by weight of the composition, for example from 10% to 80% or from 10 to 75% by weight of the composition. In one embodiment, the binder precursor and/or rehydrated binder makes up from 10 to 60% by weight of the composition, or from 1 to 50% or from 15 to 50% by weight of the composition, e.g., from 20 to 50% by weight of the composition. For cold curing applications, the amount of binder precursor and/or rehydrated binder will usually be higher, such as from 30 to 70% of the composition by weight or from 40 to 60% of the composition by weight. In one embodiment the amount of binder precursor and/or rehydrated binder is up to 50% of the composition by weight.

Suitable fillers may include one or more natural materials, e.g., selected from wood-based filler (e.g., wood chips, wood fibres, wood shavings, saw dust or the like), fly ash, mineral solid residue such as egg shells (e.g., powdered egg shells), crustacean shell (e.g., powdered crustacean shell), algae (e.g., microalgae, powdered algae residue), feathers, flour (e.g., rice flour or wheat flour), hemp, bonemeal, plastics (such as bio-based plastics and bio-degradable plastics), granulate fertiliser, quartz, glass fibres and flax fibre and combinations thereof. Preferably the filler will include wood-based filler (e.g., wood chips, wood fibres, wood shavings, saw dust or the like). However, it will be appreciated that the binder precursor and/or rehydrated binder can bind any solid material in particulate, granular or fibrous form, and thus the filler material is not specifically limited. The filler material may be organic or inorganic in origin.

In one embodiment, the filler material comprises wood-based filler, e.g., wood chips, wood shavings and/or saw dust. As noted above, this allows a product to be provided which is a non-toxic, sustainably sourced alternative to currently available engineered wood panels.

It will be understood that the type of filler material will somewhat depend on the desired type of engineered wood product of the article. For example, wood chips are used for particle boards; wood fibres are employed for medium- and high-density fibreboards; strands are used for oriented strand board; veneers or plies are used for plywood; and timber is used in cross-laminated timber and glued laminated timber (glulam). Sawdust is used in several products to smooth surfaces.

Filler material may be mixed with the binder precursor and/or rehydrated binder in any suitable amount. In one embodiment, in the composition as formed in step b) of the fifth aspect, the filler material makes up 5% by weight or more of the composition, such as 10% or more.

It may be that the filler material makes up from 10% to 99%, such as from 15 to 95%, or from 40 to 95%, or from 70 to 95%, or from 70 to 90%, by weight of the composition. In one embodiment, the filler material makes up from 10 to 90% by weight of the composition, for example from 15% to 85% or from 20 to 80% by weight of the composition. In one embodiment, the filler material makes up from 25 to 90% by weight of the composition, such as from 40 to 85% or from 50 to 80% by weight of the composition. These amounts are by weight of the composition, when considered on a wet weight basis.

A range of different ratios of binder precursor and/or rehydrated binder to filler can be contemplated and the invention is not limited to any particular ratios. In one embodiment, the ratio of binder precursor and/or rehydrated binder to filler is from 1:1 to 1:100, such as from 1:2 to 1:50 or from 1:4 to 1:20, or 5:1 to 1:10, such as from 3:1 to 1:8, e.g., from 2:1 to 1:6 or from 1.5:1 to 1:5 or from 1:1 to 1:4.

In one embodiment, the binder precursor and/or rehydrated binder makes up from 2 to 90% by weight of the binder composition, such as from 2 to 70%, or from 2 to 50%, or from 2 to 30%, or from 2 to 25%. It may be that the binder precursor and/or rehydrated binder makes up from 5 to 90% by weight of the binder composition, such as from 5 to 70%, or from 5 to 50%, or from 5 to 30%, or from 5 to 25%. It may be that the binder precursor and/or rehydrated binder makes up from 20 to 90% by weight of the binder composition, such as from 20 to 70%, or from 20 to 50%. These amounts are by weight of the binder composition, when considered on a wet weight basis. These amounts do not include any optional additives that may be added to the binder precursor and/or rehydrated binder before the shaping and curing steps, such as crosslinkers.

A benefit of the present invention is that relatively large quantities of filler material can be held together in the form of a strong shaped 3D article by a relatively small amount of the binder precursor and/or rehydrated binder.

It may be that the total weight of binder precursor and/or rehydrated binder plus filler material in the composition to be cured is 70% or more of the total binder composition by weight, e.g., 75% or more, or 80% or more, or 85% or more. In one embodiment the total weight of binder precursor and/or rehydrated binder plus filler material in the binder composition to be cured is from 75 to 95% by weight, e.g., from 80 to 95% by weight. In one embodiment the total weight of binder precursor and/or rehydrated binder plus filler material in the binder composition to be cured is from 75 to 100% by weight, e.g., from 80 to 100% by weight.

In one embodiment, one or more additives may optionally be further included in the binder composition. Suitable additives include, but are not limited to, biological agents, thickening agents (where this agent is not the starch that is an essential component of the invention), hydrophobic agents, curing agents, crosslinking agents, and/or wetting agents. Preferably the binder composition includes a cross-linking agent.

In one embodiment, the invention uses binder precursor and/or rehydrated binder, together with filler material and one or more additives in the binder composition that is shaped and cured.

Additives that are included may be added at any suitable stage. They may be provided pre-combined with the binder precursor and/or rehydrated binder, or may be mixed with the binder precursor and/or rehydrated binder. They can be added before the mixture is dried. They can be added before, during or after mixing of binder precursor and/or rehydrated binder with the filler material. They may be provided pre-combined with the filler material or may be mixed with the filler material.

Generally, when present, additives may be included in a total amount of up to 25% by weight of the binder composition, e.g., up to 20%. For example, additives may be included in a total amount of from 1 to 20%, such as from 2 to 15% or from 5 to 10%, by weight of the binder composition.

Starch is required as an essential component of the invention. The skilled person will appreciate that starch is known as a thickening agent. In one embodiment, additional thickening agents which are not starch may be included as additives. As the skilled person will appreciate, thickening agents increase the viscosity of a substance. Such increased viscosity that comes from the use of these agents may be undesirable because it can make a binder more difficult to mix with filler material. They can also increase the gelation time of a mixture.

Curing agents may be included as additives. In particular, crosslinking agents may be included as additives. As the skilled person will appreciate, crosslinking agents can increase the structural stability of a material.

Crosslinking agents that can be contemplated for use include amino crosslinkers, phenolic cross linkers, and isocyanates/polyurethanes.

Specific examples of crosslinking agents that can be used include polyamidoamine epichlorohydrin (PAE) resin, palmitoil chloride and epoxy resins. Preferably, PAE resin is used as a crosslinking agent. In one embodiment PAE resin is used. Hercosett 617 is an example of a PAE resin. This is commercially available as a liquid resin with about 13% solid content and is available from Solenis.

In particular, a PAE resin is preferably included in the binder composition, binder precursor and/or rehydrated binder in an amount of up to 40% by weight relative to the weight of the binder composition, binder precursor and/or rehydrated binder, such as up to 20% by weight, or 0.1% to 30% by weight, or from 1% to 30% by weight, or 1% to 40% by weight, such as 2% to 30% by weight, or 5% to 20% by weight; preferably from 5 to 12% by weight.

Co-binding agents may be included as additives. As the skilled person will appreciate, co-binding agents may have properties that complement the binder precursor and/or rehydrated binder according to the present invention. For example, formaldehyde-based resin, such as urea-formaldehyde, melanine formaldehyde and/or phenol formaldehyde, may be included as co-binding agents. Despite these co-binding agents comprising formaldehyde, the skilled person will be aware that the use of the binder precursor and/or rehydrated binder of the present invention allows a smaller amount of formaldehyde-based co-binding agent to be used, therefore still reducing the amount of formaldehyde in an engineered wood product. In one embodiment, a co-binding agent is an isocyanate resin, such as polymethylene diphenyl diisocyanate (PMDI), polyhexamethylene diisocyanate (PHDI), toluene diisocyanate, and/or polyurethane. For example, the binder precursor and/or rehydrated binder may comprise a co-binding agent in an amount of up to 70%, such as up to 60%, or up to 50%, or up to 30%, for example up to 20% by weight. In one embodiment, the binder precursor and/or rehydrated binder comprises a co-binding agent in an amount of from 1 to 60%, or from 1 to 50%, such as from 5 to 30%, or from 10 to 20% by weight, or from 40% to 60% by weight.

Additives, such as crosslinking agents and co-binding agents may, at least initially, decrease the viscosity of the rehydrated binder, thereby allowing the rehydrated binder to be more easily mixed with the filler. Using an additive such as a crosslinking agent or a co-binding agent to reduce the viscosity of the rehydrated binder is preferable to using water to perform this task as the addition of further water will increase the pressing and curing time that an engineered wood product will require. Even the addition of a small amount of additive, such as up to 10% of additive by weight, or 5-10% of additive by weight may have a significant impact on the viscosity of the rehydrated binder. Preferably, the addition of additives, such as 5-10 wt % of PAE, decreases the viscosity of the rehydrated binder to 500 cP or less, to allow the rehydrated binder to flow from the reaction vessel.

The skilled person will appreciate that the additive may have a water content and therefore will contribute to the total water content of the binder precursor and/or rehydrated binder. In some embodiments the water content of the additive is up to 95 wt %. Clearly the impact on the water content of the binder precursor and/or rehydrated binder will depend on both the water content of the additive and the amount of additive added.

In one embodiment, the binder precursor and/or rehydrated binder comprises a cellulose derivative such as carboxymethyl cellulose (CMC). Cellulose derivatives such as CMC bind well to polyamidoamine epichlorohydrin resins, such as Hercosett 617. Therefore, cellulose derivatives such as CMC may be added to the filler material, in particular a wood-based filler material, to increase tack and further enhance strength. The binder precursor and/or rehydrated binder may comprise a cellulose derivative, such as carboxymethyl cellulose, in an amount of 1% to 40% by weight, such as 2% to 30% by weight, or 5% to 20% by weight.

Minerals may be included as additives. In particular, silicates, such as phyllosilicates, e.g., bentonite and/or montmorillonite, and/or silica nanoparticles can strengthen the rehydrated binder. Such minerals may be used, i.e., contained by the binder precursor and/or rehydrated binder, in amounts of up to 10% of the binder precursor and/or rehydrated binder by weight, such as in amounts of 0.5% to 6% of the binder precursor and/or rehydrated binder by weight.

Fungicides and/or biocides may be included in the binder precursor and/or rehydrated binder as additives. Such agents can be employed directly in the wood to delay or prevent the colonization of the wood by bacteria and fungi. Suitable fungicides/biocides include borates, essential oils (such as from coconut and/or palm oils), tannins and chitosan. Fungicides/biocides may be used in amounts of from 0.1 to 5% by weight, such as from 0.5 to 5% by weight, or from 0.5% to 3% by weight, or from 0.5% to 1% by weight. Such agents could be applied to the article or included in the binder precursor and/or rehydrated binder, for example.

Hydrophobic agents may be included in the binder precursor and/or rehydrated binder as additives. As the skilled person will appreciate, hydrophobic agents are resistant to water. Thus they can protect a substance from absorbing moisture from the air and potentially disintegrating due to being dissolved by water. However, hydrophobic agents may reduce the adhesive properties of the binder precursor and/or rehydrated binder and should be used sparingly. Such agents are, therefore, useful for maintaining stability over a range of humidity conditions. Examples of hydrophobic agents include waxes, such as naphtha wax and natural bee wax, and palm oil compounds. In one embodiment a hydrophobic agent is added to the binder precursor and/or rehydrated binder in an amount of up to 0.5% by weight relative to the weight of the filler material. In one embodiment, the filler material is directly treated with a hydrophobic agent, either before or after treatment with the binder precursor and/or rehydrated binder, in an amount of up to 0.5% by weight relative to the weight of the filler material.

Curing agents may be included in the binder precursor and/or rehydrated binder as additives. As the skilled person will appreciate, curing agents help the curing process. This can be by initiating it or facilitating it, especially in the presence of heat. Examples of curing agents include compounds in the amidoamine family.

Wetting agents may be included in the binder precursor and/or rehydrated binder as additives. As the skilled person will appreciate, wetting agents lower the surface tension of liquids, allowing the liquids to more easily spread across the surface of an article. Substances with anti-caking properties typically allow for better wetting. Examples of wetting agents include palm oil or palm oil compounds (e.g., palmitoil chloride or other compounds comprising palmitoil chloride), coconut oil and glycerol monostearate.

The solvent content of the binder precursor and/or rehydrated binder is preferably controlled to avoid blistering and excessive steaming in the hot pressing phase, which may not only increase the time required for pressing but also disrupt existing bonds. The dry weight of the rehydrated binder should be from 25% to 65% by weight of the rehydrated binder, such as from 30% to 60%. In a preferred embodiment, the dry weight of the rehydrated binder is from 35% to 55%, or from 35% to 50%, such as from 35% to 45%. The optimal dry weight of the rehydrated binder is about 40%.

The solvent content of the binder precursor and/or rehydrated binder may be reduced by additional drying steps, which is preferably performed in a batch-wise or continuous manner. This may be performed by air-drying, where natural convection and airflow carries away water, which is slow but cheap and can be done in a tray, pan or rotary drier (e.g., a drum shaped rotary drier). Hot air may be employed to accelerate the speed at which the moisture content of the binder precursor and/or rehydrated binder is reduced, which avoids pre-curing. For example, the hot air may be applied at a temperature of from 30 to 100° C., such as from 40° C. to 90° C. The solvent content of the binder precursor and/or rehydrated binder may be increased by mixing the rehydrated binder with solvent, such as water.

The method of the present invention may optionally include a treatment for the binder precursor and/or rehydrated binder with a bleaching agent, such as sodium hypochlorite, hydrogen peroxide, or ozone. This step may decrease the odour and/or lighten the colour of the binder. By-products of this treatment may be removed during an additional drying step, if necessary.

The method of the present invention may optionally include a treatment for the binder precursor and/or rehydrated binder, prior to mixing the binder precursor and/or rehydrated binder with the filler material. For example, this may be a pre-heating treatment. In one embodiment the binder precursor and/or rehydrated binder is heated to a temperature of 30 to 60° C., such as from 30 to 50° C. or from 30 to 40° C. This can assist in making the rehydrated binder less viscous before mixing with the filler material. It can also assist if the product is made by hot pressing, because the binder precursor and/or rehydrated binder is then above room temperature already when it is hot pressed.

In general, the binder precursor and/or rehydrated binder may be at a temperature of from 15 to 60° C. when it is mixed with the filler material, e.g., from 20 to 50° C.

The method of the present invention may optionally include a treatment for the filler material, prior to mixing the binder with the filler material. For example, this may be to wash, dry and/or bleach the filler material, and/or it may be that the filler material is chopped or ground into smaller particles. This may achieve a particularly desirable appearance and/or mechanical or chemical characteristics for the resulting article.

In the methods of producing an article, the composition which comprises the binder precursor and/or rehydrated binder, filler material, and any optional additives, is shaped and cured.

Thus the composition is shaped into a three-dimensional shape, which is the desired shape of the shaped article, before or during curing. In one embodiment, the shaping is carried out by use of a mould (e.g., by press moulding), by 3D printing, by casting, by pressing or by sculpting. In one embodiment, the composition is rolled into shape by rollers. In another embodiment, the composition is compressed into shape under pressure.

The pressure applied during the shaping and/or curing may, in one embodiment, may be 0.5 MPa or higher, e.g., from 0.5 to 30 MPa, such as from 0.5 to 20 MPa or from 0.5 to 16 MPa and especially between 0.5 and 14 MPa, or from 1 to 14 MPa, such as from 5 to 14 MPa, preferably from 10 MPa to 14 Mpa. For particle boards, it will usually be 1 MPa or higher, such as from 1 to 20 MPa, e.g., from 1 to 14 MPa or from 1 to 12 MPa, and for MDF it will usually be 1 MPa or higher, especially 5 MPa or higher, such as from 1 to 20 MPa, e.g., from 1 to 14 MPa or from 10 to 14 MPa. For plywood, the pressure will usually be from 10 to 14 MPa, e.g., about 12 MPa.

Heat may be applied during the shaping step, e.g., up to 80° C., or the shaping may be carried out at room temperature.

Heat may be applied during the curing step, e.g., a temperature of from 30 to 250° C. may be used, such as from 30 to 70° C.; preferably the curing temperature is from 50 to 250 or from 75 to 250° C.; such as from 100° C. to 230° C., and preferably from 150° C. to 210° C. Alternatively cold curing may be used, i.e., room temperature (15 to 25° C.). In one embodiment the temperature during curing is from 15 to 250° C., e.g., from 15 to 230° C., such as from 20 to 210° C.

Before or after shaping, the composition may be stacked and/or layered with other compositions so as to form a composite product once shaped and cured.

The composition may be shaped into a three-dimensional shape, which is the desired shape of the shaped article, during or after the step of mixing the binder precursor and/or rehydrated binder with the filler material.

In one preferred embodiment a mould is used for shaping. A release agent may be applied to the mould before the binder composition is placed in the mould, to aid removal of the cured article. Thus the composition is placed in the mould before curing, such that the article takes on the shape of the mould when it cures. In one embodiment the composition is pressed into a mould.

The cured article can then be removed from the mould post-curing. This is conventional and known in the art. Thus a stand-alone, shaped article is provided.

The composition may be cured at room temperature and atmospheric pressure ("air drying"). In this case, complete curing will normally occur over a period of 7-14 days, depending on humidity.

The composition may be cured at elevated temperature and/or pressure. This leads to reduced time periods for curing to be completed.

In one embodiment, curing may be aided in a drying device, where the temperature is increased above room temperature and air is allowed to flow. The pressure can be atmospheric pressure. An industrial oven may be used for this purpose. In one such embodiment the temperature is in a range of from 30 to 70° C. In this case, complete curing will normally occur over a period of 30 minutes to 24 hours, e.g., 1 to 12 hours, depending on temperature and humidity.

In a preferred embodiment, curing may be aided with the application of pressure as well as elevated temperature, for example with a hydraulic heat press ("hot-press") device. Such devices typically apply from 1 to 20 MPa, such as from 1 to 16 MPa, or 1 to 14 MPa, e.g., from about 5 to 14 MPa, or 10 to 14 MPa, of pressure for from 1 to 15 minutes, e.g., from 3 to 10 minutes or from 3 to 7 minutes, at a temperature in a range of from 100° C. to 300° C., such as from 100° C. to 220° C., or from 100° C. to 230° C., or from 175° C. to 225° C., or from 120° C. to 180° C. Preferably a temperature in a range of from 150° C. to 250° C. or from 150° C. to 220° C., or from 190° C. to 220° C. is used. Preferably a temperature in a range of from 150° C. to 250° C. is used for from 3 to 10 minutes. The temperature used in the curing process may depend on the desired type of engineered wood product. For example, plywood may be cured at a temperature of from 80° C. to 230° C., such as from 80° C. to 120° C.; fibreboards, such as medium-density fibreboard, may be cured at a temperature of from 170° C. to 230° C.; and particleboards may be cured at a temperature of from 160° C. to 230° C.

In general, curing the binder precursor and/or rehydrated binder fully requires raising the core temperature to about 104° C. or higher.

The pressure applied to the article by the press may be an important factor. Excessive pressure can cause the disruption of bonds within an article, whilst insufficient pressure can produce an article that is not strong or dense enough. The pressure applied by a press, such as a hydraulic heat press, may be up to 13.8 MPa, such as 0.48 to 6.9 MPa. The pressure used in the curing process may depend on the desired type of engineered wood product. For example, particleboard may be cured at 1.38 to 3.5 MPa; fibreboards, such as medium-density fibreboard, may be cured at 0.48 to 5.2 MPa; and plywood may be cured at 0.68 to 2.1 MPa. In particular, the low pressures used for plywood prevent the veneers from warping.

It may be that curing the binder precursor and/or rehydrated binder within a hydraulic heat press partially cures the rehydrated binder and the article provided therefrom may benefit from resting in atmospheric conditions for a period of up to two weeks to allow the article to cool and to allow the binder precursor and/or rehydrated binder to completely cure. In one embodiment, following the curing step, the article is rested in atmospheric conditions for a period of up to two weeks, such as three days to two weeks.

As the exposure to high temperatures is only for a short period in this curing technique this is acceptable and does not adversely affect the desired properties of the articles.

In another embodiment, curing may be aided with the application of pressure but at room temperature. For example, the composition may be compressed into a mould using a hand press before being left to cure under atmospheric conditions. A hand press may have a capacity of from 0.5 to 12 kN, e.g., from 0.75 to 7.5 kN or from 1 to 5 kN. Pressure may suitably be applied for from 1 to 10 minutes before being left to cure under atmospheric conditions.

In some embodiments of the invention, the binder precursor and/or rehydrated binder is used as an adhesive to secure two component parts together, to produce a composite product. The binder precursor and/or rehydrated binder may therefore be applied to a contact surface of one or both component parts before bringing them together. Binder or rehydrated binder may be applied to a surface of a first component part and dried to form a coating, before contacting the coating with a surface of a second component part and applying heat and/or pressure to cure the coating and adhere the first component part to the second component part.

The contact surfaces may be made of any suitable material. Examples include wood (including engineered wood products, such as chipboard), glass, paper, cardboard and plastic. The contact surfaces may be the same or different.

The binder precursor and/or rehydrated binder may be applied to a contact surface of a component part by any suitable means. For example, the binder precursor and/or rehydrated binder may be spread on the contact surface using an applicator. The skilled person will be aware of glue applicators, e.g., of the type that apply glue to a surface by use of spray nozzles that spray the glue over the roll. Alternatively, it may be applied without spreading, e.g., it may be deposited onto the contact surface from a nozzle or other supply means. It will be understood that the act of bringing the contact surfaces together may spread the binder precursor and/or rehydrated binder.

In one embodiment, once the contact surfaces are brought together pressure is applied. This can assist with securing the surfaces together.

The binder precursor and/or rehydrated binder may be applied to only one of the two contact surfaces before the two contact surfaces are brought together. Alternatively, the binder precursor and/or rehydrated binder may be applied to both contact surfaces before the contact surfaces are brought together.

The binder precursor and/or rehydrated binder may optionally be allowed to partially cure, as with contact adhesives, prior to the surfaces being brought together.

The time for curing of the binder precursor and/or rehydrated binder to secure the two contact surfaces together may depend on factors such as the material(s) that the component parts are formed from, the size of the contact surfaces, the temperature of curing and the humidity. As such, curing may take place at room temperature over a period of time of up to 7 days. It may be from 10 minutes up to 72 hours, e.g., from 30 minutes up to 48 hours, or from 1 to 24 hours. Curing to secure the two contact surfaces together may be accelerated at higher temperatures, for example at from 30 to 70° C., and/or with application of pressure. Under such conditions, curing may occur over a period of time of up to 24 hours, e.g., from 1 minute up to 6 hours, or from 2 minutes up to 3 hours, or from 5 minutes up to 1 hour, depending on the temperature chosen.

As discussed above, the rehydrated binder of the invention can undergo one or more cycles of being dried and rehydrated. In dry form it can be considered a binder precursor. It can be provided in dry form by itself, e.g., in the form of a powder, but it can alternatively be provided in dry form in combination with a support. For example, it can be provided in dry form as a coating on a surface and/or as an impregnating agent that is dried in pores extending from a surface. The surface may, for example, be a surface of a component part of a composite product (e.g., a component part that is made of paper or wood). The surface may be a surface of a filler material, e.g., wood-based filler material such as wood chips, saw dust, wood fibres and/or wood shavings. When the binder precursor is rehydrated it can be cured (with heat and/or pressure) in order to achieve a binding or adhering effect.

When the methods of the eleventh and the twelfth aspects are used to form a precursor to a composite product, these methods result in a composite product precursor which comprises a first component part of the composite product having a binder precursor located at or near a surface thereof. This composite product precursor can then be adhered to a second component part of the composite product by contacting the surface of the first component part with a surface of the second component part of the composite product and curing the binder precursor. The curing conditions, e.g., hot pressing conditions, as discussed above may be used. The component parts to be joined together, to produce a composite product, may be as discussed above.

Advantageously, there is no need for solvent to be added to rehydrate the binder precursor. In this regard, it may be that sufficient moisture is provided by the atmosphere and/or by the component part(s), especially if they comprise wood.

When the methods of the eleventh and the twelfth aspects are used to form a precursor to a shaped article, these methods result in filler material product having a binder precursor located at or near a surface thereof. This filler material can then be used in a method according to the third aspect or fifth aspect or sixteenth aspect. The conditions as discussed above (e.g., in terms of curing conditions) can therefore be used. The filler materials may be as discussed above.

The use of the filler material product having a binder precursor located at or near a surface thereof in these methods may lead to the formation of stronger products.

As discussed above, surprisingly, the binder in dry form (which, as noted above, can be considered a binder precursor) can even be utilised after curing. In other words, the binder in dry form can be obtained from an existing product where the wet form of the binder was used to make a product by curing under heat and/or pressure. Therefore an engineered wood product made from the wet form of the binder can be recycled, by breaking it up into a plurality of pieces (e.g., into wood chips, wood shavings, wood fibres and/or sawdust) and then these pieces will have binder precursor on their surfaces and possibly in any pores or voids therein. These pieces can then be used to make a new engineered wood product, e.g., particleboard.

Therefore the binders of WO 2018/215742 A1 can be re-used, even after being heated and/or pressed. This could be beneficial in specific industrial process applications. The dry binder on the wood pieces will contribute to the strength of new engineered-wood products, and thus no additional binder, or less additional binder, will be needed when making such new products.

When the methods of the seventeenth, eighteenth or nineteenth aspects are used to form wood-based filler product, step I) of providing an engineered wood product may be carried out using the methods and teachings of WO 2018/215742 $A_1$, the contents of which are incorporated herein by reference. The disclosures above regarding forming a three-dimensional shape (from filler material or from component parts in the form of layers) and regarding curing a binder composition into a three-dimensional shape, In one embodiment, in the method of the seventeenth, eighteenth or nineteenth aspect, step I) of providing an engineered wood product may involve making said engineered wood product. In said making of said engineered wood product, the step a) of providing a binder may involve making said binder.

In step I) of providing an engineered wood product, it will be appreciated that the step d) of curing the binder composition should be carried out such that the binder is not burnt, due to excessively high temperatures. The skilled reader will understand that if the binder is to be re-used it must not be burnt. However, as shown in the Examples, the binder can be cured with, for example, temperatures of 200° C. and can be successfully re-used. In one embodiment the temperature during curing is from 15 to 250° C., e.g., from 15 to 230° C., such as from 20 to 210° C.

In the method of the twenty-first aspect, the optional and preferred details and features of the steps of b) optionally mixing the wood-based filler product with water and/or a crosslinker; c) shaping the wood-based filler product into a three-dimensional shape; and d) curing the binder precursor to form a shaped article having said three-dimensional shape are all as set out above, e.g., in the context of the third aspect or the fifth aspect. The dry binder material that has been produced by making an engineered wood product, and thus which has been dried by having been cured, is surprisingly effective as a binder. This permits a new engineered wood product with good properties (e.g., good strength) to be made from a recycled binder.

Optionally, additional binder can be added in the method of the twenty-first aspect, e.g., this may be added before, during or after step b). This additional binder may be additional binder according to the present disclosure and/or according to WO 2018/215742 $A_1$, and/or may be conventional binder. What is significant is that additional binder is not necessary, and that if additional binder is used it can be used in lower amounts.

The binder precursors and/or rehydrated binders of the present invention may find many useful applications as adhesives. For example, the binder precursors and/or rehydrated binders of the present invention may be used as adhesives in construction or furniture applications, e.g., to create laminate sheet products or to join together component parts of a furniture article, or in the packaging industry, such as for adhering labels to glass bottles or jars.

The articles of the present invention may be, for example, construction articles, such as insulation boards (such as low-density insulation boards); flooring structures or roofing structures (including tiles, sheets and panels); packaging articles, such as crates, boxes or trays; or furniture articles, such as tables, chairs or stools. However, the invention is not limited to a particular type of article.

The articles of the present invention may be used, for example, as replacements for plastic articles and for traditional engineered wood articles, such as formaldehyde-urea resin-bound articles, e.g., particle board panels. Engineered wood panels are normally square or rectangular shaped and can commonly have a depth (thickness) of 2 mm or more, especially 5 mm or more or 9 mm or more or 10 mm or more, e.g., around 2 to 50 mm, such as 15 to 40 mm, e.g., 12 mm or 18 mm or 22 mm or 30 mm or 38 mm. Particle board panels will normally be square or rectangular shaped and can commonly have a depth of 5 mm or more, especially 8 mm or more or 9 mm or more or 10 mm or more, e.g., around 10 to 50 mm, such as 15 to 40 mm, e.g., 12 mm or 18 mm or 22 mm or 30 mm or 38 mm. Fibreboard panels, such as MDF panels, are normally available with a depth of 3 mm, 6 mm, 9 mm, 12 mm, 15 mm, 18 mm or 25 mm.

The article may be in the form of a regular shape, e.g., a rectangular, square or hexagonal panel or sheet or tile. The shaped articles can be standard shapes, such as square or rectangular sheets or panels, but the invention is not limited to particular shapes.

Unless stated otherwise, all values given as % are % by weight.

The invention will now be further described, in a non-limiting manner, with reference to the following examples. Some examples may not fall within the scope of the present invention but are related to the invention and are included to aid the skilled person's understanding of the invention.

EXAMPLES

In the following examples, unless stated otherwise a yeast-based binder (*Saccharomyces cerevisiae*) was obtained and used. However, it will be appreciated from the above discussions, and the Examples of WO 2018/215742 A1, which are incorporated herein by reference, that other fungi or beta glucan may be used to form the binder.

The Examples of WO 2018/215742 A1 are relevant to assist understanding of the present invention. Generally, Examples 1 to 7 of WO 2018/215742 A1 presented a binder (binder A), and illustrated its properties and versatility through various prototypes.

Examples 8 to 12 of WO 2018/215742 A1 generally described another binder (binder B) that had been adapted for application in the engineered wood industry, and more specifically, for particleboards and MDF, and its performance was assessed from lab-scale tests and larger scale industry standard tests.

The Examples of WO 2018/215742 A1 described that carrying out an alkali treatment and an acid treatment on a starting mixture of fungi or glucan together with starch led to a binder product that had a paste-like texture. This had low viscosity and could be readily mixed with filler material, such as wood chips or sawdust. This mixture was shaped and cured to give a 3D shaped article that had excellent strength characteristics. Fast cure times were achieved, e.g., about 10-18 seconds/mm of thickness.

It was proposed that the alkali treatment lysed the fungi cell walls and solubilised the basic soluble glucans. The acid treatment dissolved acid soluble glucans and likely broke down the glucans into smaller polysaccharides.

The starch, e.g., dextrin, was also found to be important—the binding and strength properties were reduced in its absence. It was proposed that the starch interacted with glucans through hydrogen bonding, which strengthened the macromolecular interaction between the binder and the filler material, especially when the filler material comprises wood, as it is thought there is an interaction with cellulose present in the wood that improves the strength of the end product.

A range of fungi starting materials, including animal feed stock yeast, various mushrooms, and baker's yeast, were shown to work, as were glucans.

The use of a crosslinker was found to be optional but it was shown that a crosslinker such as a PAE crosslinker gave improved results. It was proposed that the crosslinker stabilised the macromolecular network between the binder and the filler, possibly by reacting with the lignocellulose of the wood and the glucans to stabilise the macromolecular interactions. It was proposed that the crosslinker may have led to a complex molecular network between the lignocellulose of the wood and the glucans, which was further enhanced by hydrogen bonds that increased the adhesive effect.

The following Examples reflect the teaching of the present invention. The following Examples describe experiments relating to a series of fungi-based binders that have been produced, dried, optionally rehydrated, then used to produce articles for application in the engineered wood industry.

Example 1: Synthesis of Yeast-Based Binders 1-5

A series of yeast-based binders were synthesised. Baker's yeast (250 g, ~5% water content, sold under the brand Fermipan, sourced from Lallemand Baking UK) and dextrin (13 g, ~1-5% water content, sourced from Atlantis Art Materials) were mixed dry in a 1.5 L stirred autoclave equipped with a stirrer. Any lumps (agglomerations) of yeast or dextrin were crushed. The mixture was stirred continuously until no lumps were observed.

Solvent (320 ml) was then added to the yeast and dextrin mixture to assist mixing, because the yeast material had a very low water content. Each solvent system added to the yeast and dextrin mixture is detailed in Table 1, below:

TABLE 1

| Binder | Solvent (mL) |
|---|---|
| 1 | water (320) |
| 2 | acetone (160), water (160) |
| 3 | methanol (160), water (160) |
| 4 | methanol (224), water (96) |
| 5 | ethanol (160), water (160) |

In each experiment, the yeast, dextrin and solvent were mixed in an orbiter (Morphy Richards Standing Orbiter 400020) at 100 to 123 rpm (Speed 6 on the machine). It was ensured that any lumps of material were broken up and that the mixture was homogenous. The resulting mixtures had a pH of about 7.

Sodium hydroxide (32 g, 37 wt % solution in water, purchased from Fisher Scientific UK) was added to the orbiter and mixed at 100 to 123 rpm for 1-5 minutes to form an alkaline composition. It was again ensured that any lumps of material were broken and that the mixture was homogenous. The resulting mixture had a pH of about 11-12.

HCl (52 g, 14 wt % solution in water, purchased from Fisher Scientific UK) was then added to the alkaline composition. The mixture was mixed in the orbiter at 100 to 123 rpm (Speed 6 on the machine) for 6-10 minutes to afford yeast-based binders 1-5 (667 g) as light brown, creamy substances with molasses-like viscosities.

The resultant yeast-based binders 1-5 had a dry content of 40%. The resultant yeast-based binders 1-5 initially had a pH of about 9, which fell to around pH 6-7 after being left to stand for four hours.

Example 2: Dehydration of Yeast-Based Binders 1-5

Yeast-based binders 1-5 (250-500 g) were, individually, spread evenly on the plates of a dehydrator (Aicok automatic dehydrator, model number ASINPO30KVIN19822, 240 W, available from Amazon UK) with a 3 L capacity. The dehydrator temperature was set at 50° C. and dryness of each sample was observed at various intervals. The time that each binder took to dry was recorded and is shown in Table 2:

TABLE 2

| Binder (hours) | Time to dehydrate |
|---|---|
| 1 | 10.0 |
| 2 | 3.0 |
| 3 | 8.0 |
| 4 | 8.0 |
| 5 | 8.5 |

It can be seen that binders 2-5, which contained acetone, methanol or ethanol to replace some of the water, dried faster than binder 1 where only water was used. The use of 50% acetone 50% water was found to be particularly beneficial in terms of its drying time—drying in only 3 hours compared to 10 hours for water alone.

Increasing the amount of methanol used from 50% to 70%, and therefore decreasing the amount of water from 50% to 30%, did not significantly alter the drying time, as shown by the results for binders 3 and 4.

Each dehydrated binder was collected, weighed and pulverized to a fine powder using a grinder (Henry Charles Manual Grinder, available from Amazon UK). The resulting powdered binders 1'-5' were transferred to sealed containers for storage.

Figure 1B:
FIG. 1b is a photograph of powdered binder 3' according to the invention, as made in Example 2.

Powdered binder 2' is shown in FIG. 1a whilst powdered binder 3' is shown in FIG. 1b.

Example 3: Rehydration of Powdered Binders 1'-5'

100 g of each dehydrated, powdered yeast-based binder 1'-5' was mixed with water (86 g). The resulting composition was mixed at 20-40° C. until a homogenous and free-flowing fluid was obtained, giving rehydrated binders 1"-5". The dry content of each rehydrated binder 1"-5" was about 53 wt %.

Example 4: Producing Boards from Rehydrated Binders 1"-5"

Each rehydrated binder 1"-5" was used to make boards using the same approach as described in Example 12 of WO 2018/215742 A1 but with the three following differences. First, the resin loading was 10% (dry resin weight over dry wood weight) for wood chips and 12% for sawdust. Second, 11% (wet weight over wet binder weight) of PAE described at the beginning of Example 9 of WO 2018/215742 A1 were added to each binder. Third, the wood chips were sourced from a different provider and were softer, which explains why the boards obtained have a higher density than in Example 12 of WO 2018/215742 A1 although the same amount of pressure was applied.

Example 5: Strength Testing of Boards Produced from Rehydrated Binders 1"-5"

After the boards produced by Example 4 were stored for 5 days, the modulus of rupture (MOR) of two board samples produced from each rehydrated binder 1"-5" was determined according to the method described in Example 12 of WO 2018/215742 A1, with a metal circle of 1 cm diameter pushing, and with a length of 70.1 mm between the two points.

The boards each exhibited a density of approximately 850 kg m$^{-3}$. The results of the tests are shown in Table 3.

TABLE 3

| | Binder | | | | | | | | | |
|---|---|---|---|---|---|---|---|---|---|---|
| | 1" | | 2" | | 3" | | 4" | | 5" | |
| | | | | | Solvent (percent) | | | | | |
| | water (100) | | acetone (50), water | | methanol (50), water | | methanol (70), water | | ethanol (50), water | |
| | | | | | Batch number | | | | | |
| | 1 | 2 | 3 | 4 | 5 | 6 | 7 | 8 | 9 | 10 |
| Curing time (s) | 360 | 240 | 360 | 240 | 300 | 240 | 360 | 240 | 360 | 240 |
| MOR (MPa) accounting for board density | 23.20 | 17.43 | 25.52 | 23.47 | 24.51 | 24.74 | 22.68 | 16.70 | 21.46 | 14.97 |
| Standard deviation | 0.7 | 1.5 | 0.7 | 1.4 | 2.8 | 1.8 | 1.4 | 1.5 | 0.6 | 0.1 |

It can be seen that boards produced by rehydrated binders according to the invention are strong, as exhibited by the excellent MOR values.

The strength of the boards produced using organic solvents in addition to water (batch numbers 3-10) were generally as good as, if not better than, those produced using water alone (batch numbers 1 and 2).

In many cases, boards cured for 360 seconds were found to be stronger than boards cured for 240 seconds. However, where methanol was used in combination with water, a binding time of 240 seconds was found to produce a comparably strong board as when a binding time of 300 seconds was used.

Example 6: Producing Boards from Powdered Binder 3'

In one experiment, dehydrated binder 3' was mixed with PAE cross linker (Hercosett 617 containing 13 wt % solid cationic polyaminoamide-epichlorohydrin resin) before being blended with wood chips using the same quantities as in Example 4. In other words, the dehydrated binder 3' was used directly as a powder without being rehydrated, and mixed only with PAE cross linker using the same dry basis ratio as in Example 4.

In another experiment, dehydrated binder 3' was directly blended to the wood chips with the same quantities as in Example 4. Again, the binder was used in dehydrated form rather than rehydrated form, and in this case used as a powder directly without any additive. For this experiment, the wood chips were slightly wetted before mixing them with the dehydrated binder 3' powder.

The procedure described in Example 12 of WO 2018/215742 A1 was used to make boards, with the quantities in terms of resin loading as set out in Example 4.

Example 7: Strength Testing of Boards Produced from Powdered Binder 3'

After the boards produced by Example 6 were stored for 5 days, the modulus of rupture (MOR) of two samples of each board were determined according to the method described in Example 5.

The results of the tests are shown in Table 4.

TABLE 4

| Binder | 3' | |
|---|---|---|
| Solvent (percent) | methanol (50), water (50) | |
| Batch number | 1 | 2 |
| Additive | PAE | — |
| Curing time (s) | 240 | 240 |
| MOR (MPa) accounting for density (method ab) | 14.64 | 15.84 |
| Standard deviation | 2.8 | 1.4 |

As shown by the standard deviation, the difference in strength between the boards made from binder 3' is not statistically significant.

It can be seen from Table 3 and Table 4 that although all boards made according to the invention had acceptable properties, the boards produced from rehydrated binder have a superior strength compared to boards produced directly from the binder precursor.

It is hypothesized that, because the powdered binder precursor was mixed with the filler material in a dry state, and no further solvent was added, there was not enough moisture available to create the strong bonds that are normally formed between the binder and the filler material. Another possible reason is that the solvent helps to spread the binder more uniformly and in a thinner layer onto the wood chips and sawdust.

It is surprising that the dehydrated version of the binder can be mixed with wood chips, without additional solvent, to produce strong and useful particleboards. In addition, being able to use the dehydrated binder directly, without adding water, is beneficial, because using lower amounts of water will reduce the curing time.

Comparative Example 8: Synthesis of Acid-Free Yeast-Based Binders 6 and 7

Baker's yeast (250 g, ~5% water content, sold under the brand Fermipan, sourced from Lallemand) and dextrin (13 g, ~1-5% water content, sourced from Atlantis Art Materials) were mixed dry. Any lumps (agglomerations) of yeast or dextrin were crushed.

Solvent (320 ml) was then added to the yeast and dextrin mixture to assist mixing, because the yeast material had a very low water content. For binder 6, the solvent was water. For binder 7, the solvent was a 1:1 ratio of methanol to water (i.e., 160 mL methanol and 160 mL water).

The yeast, dextrin and solvent were mixed in an orbiter (Morphy Richards Standing Orbiter 400020) at 100 to 123 rpm (Speed 6 on the machine). It was ensured that any lumps of material were broken up and that the mixture was homogenous. The resulting mixture had a pH of about 7.

Sodium hydroxide (32 g, 37 wt % solution in water) was added to the orbiter and mixed at 100 to 123 rpm for 1-2 minutes to form yeast-based binders 6 and 7. The resulting mixture had a pH of about 11-12.

Comparative Example 9: Dehydration of Yeast-Based Binders 6 and 7

Yeast-based binders 6 and 7 (250-500 g) were, individually, spread evenly on the plates of a dehydrator (Aicok automatic dehydrator, model number ASINPO30KVIN19822, 240 W, available from Amazon UK) with a 3 L capacity. The dehydrator temperature was set at 50° C. and dryness of each sample was observed at various intervals. Binder 6 (water only) took 10 hours to dehydrate; Binder 7 (1:1 methanol:water) took 8 hours to dehydrate.

The dehydrated binders were collected, weighed and pulverized to a fine powder using a grinder (Henry Charles Manual Grinder, available from Amazon UK). The resulting powdered binders 6' and 7' were transferred to sealed containers for storage.

Comparative Example 10: Rehydration of Powdered Acid-Free Binders 6' and 7'

100 g of each dehydrated, powdered yeast-based binder 6' and 7' was mixed with water (86 g), followed by PAE cross linker (11 g, Hercosett 617 containing 13 wt % solid cationic polyaminoamide-epichlorohydrin resin). The resulting composition was mixed at 20-40° C. until a homogenous and free-flowing fluid was obtained, giving rehydrated binders 6" and 7". The dry content of each rehydrated binder was about 53 wt %.

Comparative Example 11: Production of Boards and Panels Using Acid-Free Binders 6" and 7"

Each rehydrated binder 6'-7" was used to make boards as in Example 12 of WO 2018/215742 A1 with the three following differences. First, the resin loading was 10% (dry resin weight over dry wood weight) for wood chips and 12% for sawdust. Second, 11% (wet weight over wet binder weight) of PAE described at the beginning of Example 9 of WO 2018/215742 A1 were added to each binder. Third, the wood chips were sourced from a different provider and were softer, which explains why the boards obtained have a higher density than in Example 12 of WO 2018/215742 A1 although the same amount of pressure was applied.

Comparative Example 12: Strength testing of boards produced from rehydrated acid-free powdered binders 6" and 7"

Two board samples were produced from each rehydrated binder 6" and 7", according to Example 12 of WO 2018/215742 A1.

Their density was about 850 kg m-3. The results of the tests are shown in Table 5.

TABLE 5

| Binder | 6 | | 7 | |
|---|---|---|---|---|
| Solvent (percent) | water (100) | | methanol (50), water | |
| Batch number | 1 | 2 | 3 | 4 |
| Curing time (s) | 240 | 360 | 240 | 360 |
| MOR (MPa) accounting for board density | 15.89 | 18.87 | 21.15 | 19.00 |
| Standard deviation | 1.3 | 1.2 | 0.8 | 1.1 |

Comparing these results to those shown in Table 3, where the binders made involved yeast being treated with base and acid, show that only treating the yeast with base produces an inferior binder that produces weaker boards. Therefore, it is important to treat yeast with both acid and base to produce a strong binder.

Example 13: Comparison of the Invention with Binder as Produced without Using Water i.e. Only by Using Low-Boiling Point Solvent A series of yeast-based binders were synthesised according to the method of Example 1, except that instead of adding water (320 ml) to the yeast and dextrin mixture, alternative solvent systems were used that did not include any water but rather only included low-boiling point solvents (a. acetone b. methanol, and c. ethanol). No water is added in the preparation of the binder expect for the water used in the alkaline agent and acidic agent.

Therefore to the dry mix of yeast (250 g) and dextrin (9 g), 320 ml of the low-boiling point solvent is added incrementally, followed by continuous stirring to obtain a homogenous mixture with no lumps. This is then followed by alkali and acid treatments as described in Example 8 of WO 2018/215742 A1. The resulting mixture is stirred vigorously using an electric mixer with orbiter.

A comparison was made by repeating the same protocol but using a 1:1 mix (v/v) of methanol and water as the solvent.

The results are shown in FIGS. 2a-2d.

Figure 2B:
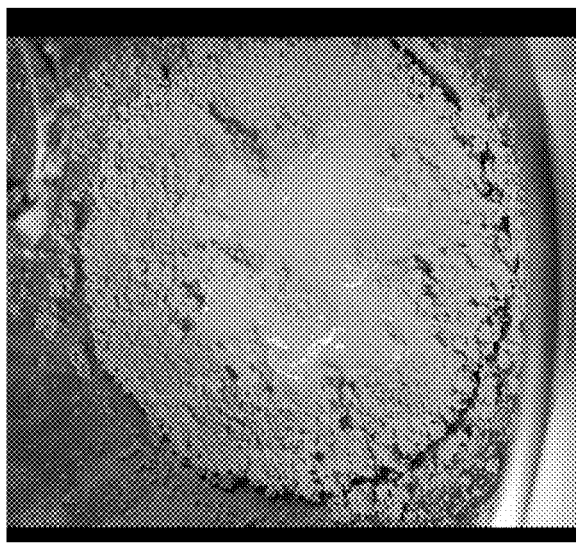
FIG. 2b is a photograph of yeast-based binder made as made in Example 13, manufactured using methanol as solvent.
Figure 2D:
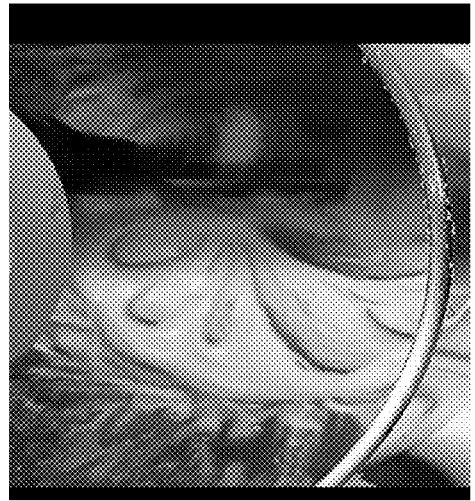
FIG. 2d is a photograph of yeast-based binder made as made in Example 13, manufactured using a 1:1 mix of methanol and water as solvent.
Figure 2A:
FIG. 2a is a photograph of yeast-based binder made as made in Example 13, manufactured using acetone as solvent.
Figure 2C:
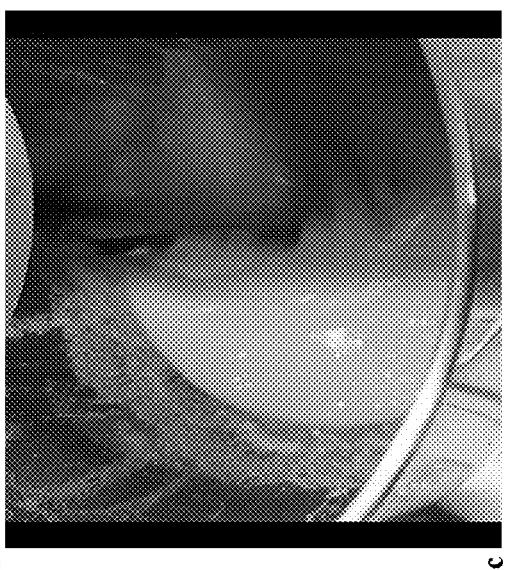
FIG. 2c is a photograph of yeast-based binder made as made in Example 13, manufactured using ethanol as solvent.

From FIG. 2a (acetone), it is observed that the mix is not homogenous and is flaky in texture. This observation is also true in the case of methanol, as shown in FIG. 2b. Meanwhile, for ethanol, as shown in FIG. 2c, the resulting mixture is too watery.

The possible reason for these results might be lack of yeast solubility, thereby causing no-cell wall disruption or lysis of the yeast. This implies that water is necessary along with the low-boiling point solvent to obtain a homogenous mixture and/or take the lysis forward to make a binder.

It can be seen from FIG. 2d that when the 1:1 mix of methanol and water is used a product is formed having a uniform and homogenous consistency.

Example 14: Comparative Production of Boards Using Non-Dehydrated Binder 1

Yeast-based binder 1 (as formed in Example 1) as used to manufacture boards, as a comparison with the equivalent binder that had been dried and powdered, and then rehydrated, i.e., rehydrated binder 1" (as formed in Example 3).

Boards made from yeast-based binder 1 were made using the quantities described in Example 4 and tested as explained in Example 5.

Both yeast-based binder 1 and rehydrated binder 1" had the same solids content of 53% and their resin loadings on wood chips and sawdust were the same.

Two board samples were produced from binder 1. The results of the tests are presented in Table 6:

TABLE 6

| Binder | 1" | | 1 | |
|---|---|---|---|---|
| Solvent (percent) | water (100) | | water (100) | |
| Batch number | 1 | 2 | 3 | 4 |
| Curing time(s) | 360 | 240 | 240 | 360 |
| MOR (MPa) accounting for board density | 23.20 | 17.43 | 17.67 | 18.44 |
| Standard deviation | 0.7 | 1.5 | 1.6 | 1.9 |

When the boards were cured for 240 seconds, the boards produced from rehydrated binder 1" are as strong as the boards produced from binder 1, taking standard deviation into account.

However, surprisingly, when the boards were cured for 360 seconds, the boards produced from rehydrated binder 1" are significantly stronger than the boards produced from binder 1, taking standard deviation into account. This shows that, surprisingly, the steps of dehydrating and then rehydrating the binder did not reduce its mechanical strength capabilities.

Example 15: Comparative production of boards using urea-formaldehyde resin

A urea-formaldehyde (UF) resin was used to manufacture boards as a comparison with the boards made from rehydrated binder 1".

Urea-formaldehyde had a dry content of about 65%. Boards were prepared as explained in Example 12 of WO 2018/215742 A1, with the exception that a resin loading (dry resin weight over dry wood) of 6% was used for sawdust and wood chips. This is a lower amount than what has been used for Binder 1" where 10% and 12% where used for wood chips and sawdust respectively.

The results of the tests are presented in Table 7:

TABLE 7

| Binder | 1" | | UF | |
|---|---|---|---|---|
| Solvent (percent) | water (100) | | n/a | |
| Batch number | 1 | 2 | 3 | 4 |
| Curing time (s) | 360 | 240 | 240 | 360 |
| MOR (MPa) accounting for board density | 23.20 | 17.43 | 25.30 | 24.87 |
| Standard deviation | 0.7 | 1.5 | 2.1 | 0.9 |

When taking into account the standard deviation of the results, it can be seen that rehydrated binder 1" forms boards of comparable strength to boards produced from UF resin.

Conclusion: Examples 1-15

The mixtures according to the present invention can be dehydrated to form a powder, and subsequently rehydrated to form a useful rehydrated binder. The binder precursor in dry powder form is more suitable for long-term storage and transport.

Dehydration of the mixtures is faster when the water, used to suspend the yeast whilst it is mixed with base and acid, is partially replaced by organic solvents, such as acetone, methanol and ethanol.

Water is required to be present in step i) to some extent (e.g. in an amount of 10 to 50% v/v with respect to low boiling point solvent) to produce a binder with good properties.

Increasing the curing time generally increases the strength (MOR) of boards.

It is important to treat the fungi/glucan (e.g. yeast) with both acid and base to produce a strong binder.

Boards produced from the rehydrated binders according to the present invention are stronger than, or at least as strong as, boards produced from yeast-based binders that have not been dehydrated or powdered.

Boards produced from the rehydrated binders according to the present invention have a strength that is comparable to boards formed from conventional urea-formaldehyde resins, but, as described previously, have additional benefits.

Example 16: Synthesis of Binders 6-13

A series of five yeast-based binders (Binders 6-10) were synthesised following the same method and amounts as the Binder 1 of Example 1 but where the 320 mL water used as solvent was substituted by the same weight of a different solvent system. The alternative solvent systems were a combination of water and acetone, with the various ratios of 90%-10%, 70%-30%, 50%-50%, 30%-70%, 10%-90% on weight basis, as shown in Table 8. The amount of dextrin remained unchanged and was 13 g in each case. Binder 1, as described in Example 1, is also shown for comparison.

TABLE 8

| Binder (relative) | Primary | feedstock (250 g) | Solvent (320 ml) | Final viscosity |
|---|---|---|---|---|
| 1 | Yeast | 100% water | | Low |
| 6 | Yeast | 90% water, 10% | acetone | Low |
| 7 | Yeast | 70% water, 30% | acetone | Medium |
| 8 | Yeast | 50% water, 50% | acetone | High |
| 9 | Yeast | 30% water, 70% | acetone | High |
| 10 | Yeast | 10% water, 90% | acetone | High |

A series of three further binders (Binders 11-13) were synthesised following the same method and amounts as used for Binder 1 but where the 250 g yeast was substituted by the same weight of a different material—beta-glucan, chaga or shitake—as shown in Table 9. Beta-glucan was obtained in powder form and sourced from The Health Corner, beta-glucan—1,3/1,6. shitake is a type of mushroom and was used as a powder, sourced from Natures Root on Amazon. Chaga is another type of mushroom and was also used as a powder, sourced from Time Health on Amazon. Chaga contains 30% polysaccharides and 8% beta-glucans. The amount of dextrin remained unchanged and was 13 g in each case. Binder 1 is also shown for comparison.

TABLE 9

| Binder | Primary feedstock (250 g) | Solvent (320 ml) | Final viscosity (relative) |
|---|---|---|---|
| 1 | Yeast | 100% water | Low |
| 11 | Beta-glucan | 100% water | High |

TABLE 9-continued

| Binder | Primary feedstock (250 g) | Solvent (320 ml) | Final viscosity (relative) |
|---|---|---|---|
| 12 | Chaga | 100% water | Low |
| 13 | Shitake | 100% water | High |

Tables 8 and 9 compare the viscosity of each binder. Yeast-based binder 6, made with 90% water and 10% acetone as solvent, and chaga-based binder 12 each had a low viscosity that was similar to that of binder 1. Yeast-based binder 7, made with 70% water and 30% acetone, had a medium viscosity. Binders 8-10, which had a higher amount of acetone relative to water, beta-glucan based binder 11, and shitake-based binder 13 had the highest viscosity found in this experiment.

Conditions to make low viscosity binders, such as binders 6 and 12, are preferable. This is because the relatively low viscosity of the binder allows it to be readily mixed with a filler material or applied to a sheet of material, whilst having a relatively high solid content means that the time required to cure the board can be reduced.

The final pH of all these binders was around 5.5-6.5.

Example 17: Dehydration of Binders 1 and 6-13

200 g of binders 1 and 6-13 were dehydrated by spreading each binder evenly on the plates of a dehydrator (BioChef Arizona Food Dehydrator, 10 trays, 1000 W, available from Amazon) to form a thin layer of about 2 mm in depth. The binders were each dried for more than 5 hours with the dehydrator temperature set at about 60° C. Each dehydrated binder was collected, weighed and pulverized to a fine powder using a grinder (Ultraselect 1000 g Electric Grain Grinder Mill, available from Amazon).

The resulting powdered binders 1' and 6'-13' were transferred to sealed containers for storage.

Example 18: Rehydration of Binders 1' and 6'-13'

Each of powdered binders 1' and 6'-13' (40 g) was individually mixed with water (60 mL) at room temperature until a homogenous and free-flowing fluid was obtained, to give rehydrated binders 1" and 6"-13". The solid content of these binders was 40%.

A further rehydrated binder, hereafter referred to as Binder 14", was made by mixing powdered yeast-based Binder 1' (40 g) with a mixture of acetone (20 mL) and water (40 mL). In other words, Binder 1' was rehydrated in an aqueous solvent system (60 mL) containing 33% acetone and 67% water.

Example 19: Producing Particleboards from Rehydrated Binders 1" and 6"-14"

Rehydrated binders 1" and 6"-14" (20 g wet weight) were each individually mixed with wet polyamide-epichlorohydrin (2 g for each binder, PAE, purchased from Solenis, 13% dry content) and the mixtures were each manually stirred.

Except for the following differences, the procedure to make particleboard on a lab scale described in Example 12 of WO 2018/215742 A1 and Example 4 as above was used to make particleboards from rehydrated binders 1" and 6"-14". Firstly, the resin loading was 8.5% (dry resin weight over dry wood weight). Secondly, the wood chips were more soft than those used in Example 12 of WO 2018/215742 A1 and Example 4 above, and were typically about 2 mm long. The wood chips were stored at room temperature, but were not dried. Their moisture content was higher than 5%. Thirdly, a different heat press (Happy Rosin, 220V Electric rosin press with 6×8 inch dual heat plates) was used to create 15 cm×15 cm boards. Fourthly, the boards were each pressed for 300 seconds with plate temperature of 200° C. and at a constant pressure in the range of 0.5-2 MPa. The boards were then stored for 7 days at room temperature. Two samples of about 43 mm×87 mm were cut from each board using a chain saw.

The density of each sample of board was measured. The samples exhibited an average density of 700 kg/m$^3$.

A 3-point flexure test was performed on each board sample, using a LLOYD LR5K machine, to measure the module of rupture (MOR) according to the method described in Example 12 of WO 2018/215742 A1, with a metal circle of 1 cm diameter pushing, with a length of 70.5 mm between the two points, and with a speed of 2 mm/s. 16 board samples were tested for binder 1, 8 board samples were tested for binder 1" and 6", and between 4 and 2 samples were tested for each of the other binders. The results of the test are presented in Table 10. A t-test was performed to see if there was a significant difference in strength between binder 1, as a benchmark, and the other formulations.

TABLE 10

| Binder | Adhesive formulation | MOR (MPa) |
|---|---|---|
| 1 | Binder B | 6.5 |
| 1" | Rehydrated Binder B | 6.7 |
| 6" | 90% water, 10% acetone as solvent | 6.7 |
| 7" | 70% water, 30% acetone as solvent | 5.7 |
| 8" | 50% water, 50% acetone as solvent | 5.1 |
| 9" | 30% water, 70% acetone as solvent | 5.0 |
| 10" | 10% water, 90% acetone as solvent | 5.5 |
| 11" | Beta-glucan instead of yeast | 5.3 |
| 12" | Chaga instead of yeast | 4.2 |
| 13" | Shitake instead of yeast | 4.4 |
| 14" | Rehydrated with 33% acetone, 67% water | 5.5 |

As shown in Table 10, all binders were found to produce strong boards.

There was found to be no significant difference in performance between the wet version of Binder B (binder 1) and the rehydrated version of this binder (binder 1"). This further supports the conclusions drawn in Example 5 and Example 14 that the adhesive can be made into a powder and further rehydrated without losing performance.

In addition, there was found to be no significant difference in strength between the benchmark, binder 1, and binder 6". This again supports the conclusions drawn from Example 5 that using organic solvents enables the time and/or energy to dry the adhesive to be reduced whilst maintaining or increasing the binder strength and curing characteristics. This presents benefits for commercial operations.

Binders 7", 8", 9" and 10" were found to have a slightly inferior strength compared to the benchmark. This is thought to be, in part, due to their higher relative viscosity (Table 8). The higher viscosity a binder has makes it more difficult to produce a homogeneous mixture of the binder with wood chips when using standard mixing equipment.

Binder 11" used beta-glucan instead of yeast. The high strength of boards made with beta-glucan is surprising given the high viscosity of the Binder 11". This further supports conclusions drawn in, for instance, Examples 10 and 12 of WO 2018/215742 A1 that binders made from beta-glucan work. This also supports the hypothesis that beta-glucan in yeast may play a crucial role in the high strength and short curing time of these binders.

Binders 12" and 13" used chaga powder and shitake powder respectively, two types of mushroom, instead of yeast. As shown by Table 10, strong boards were made from these binders. Although not as strong as the yeast-based benchmark binder 1, this also supports the conclusion reached in Example 12 of WO 2018/215742 A1 that rehydrated binders made of types of fungi other than yeast also work.

Finally, binder 14" produced boards of only slightly inferior strength compared to the benchmark. This illustrates that the powdered binder can be rehydrated with a range of solvent systems other than water alone, such as mixture between an organic solvent and water. Furthermore, rehydration with mixed solvent systems can produce a binder that can be used to produce boards of a similar strength to those produced using a binder rehydrated with water alone. By using mixtures of water with organic solvents it is expected that it will be possible to reduce the curing time of the binder, especially where the additional solvents have a lower boiling point than water.

Example 20: Production of Plywood Using Rehydrated Binder 1"

Rehydrated binder 1" was used to make plywood boards. 2.96 kg of powdered binder 1' was rehydrated with 5.04 kg of water to give 8 kg of rehydrated binder 1" having a dry content of 37%. In this example, the binder was used without any other additive.

A first wood sheet sized 41 cm×41 cm was placed on top of a second wood sheet of the same size but rotated by an angle of 90°. 40 g of rehydrated binder 1" (corresponding to a dry resin loading of 88 g/m$^2$) was applied on the second sheet and spread with a brush to create a thin layer. The second sheet was turned over so that the glued surface was in contact with the first sheet, and the second sheet was aligned with the first sheet. A third wood sheet with same dimensions was applied on top of the second sheet at a 90° angle with respect to the second sheet. 40 g of binder was again applied on the surface of wood sheets using the same process as before. The process was repeated until the structure had 7 layers of wood sheet, with each layer orientated at 90° to its two adjacent layers and with a layer of glue between each layer. The board was pressed at about 20 MPa at a temperature of about 125° C. for 14 minutes.

Figure 3:
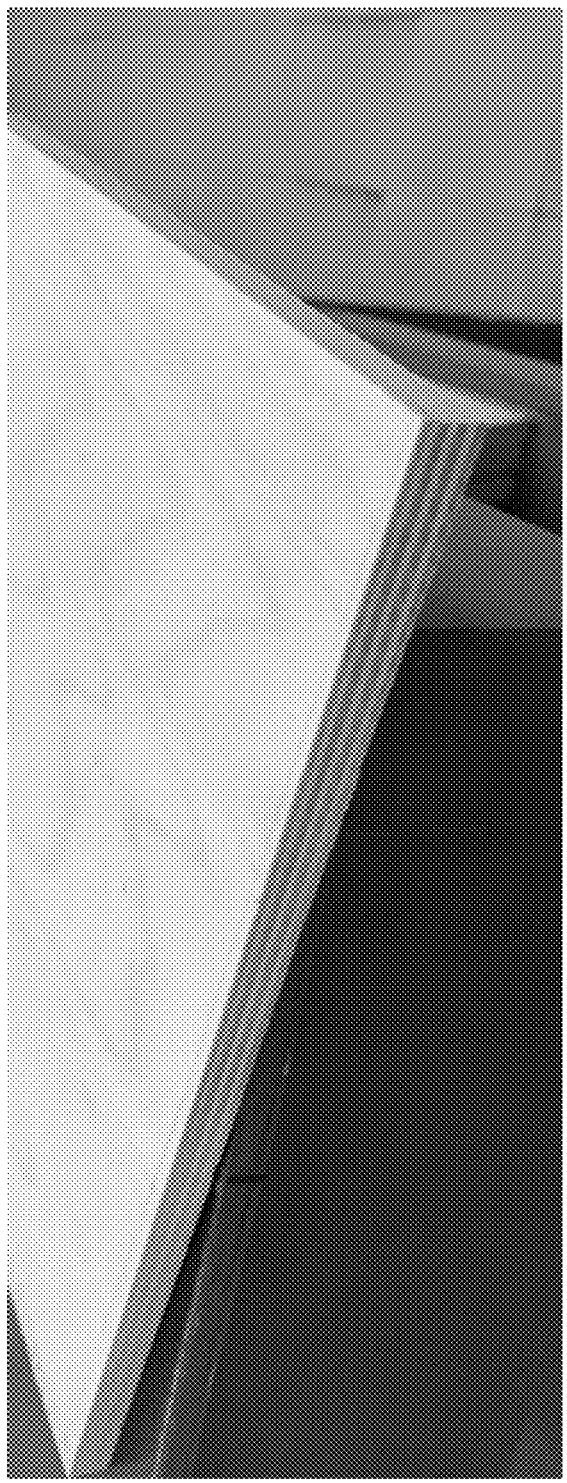
FIG. 3 is a photograph of plywood board as made in Example 20, manufactured using powdered binder 1' according to the invention.

This produced a board shown in FIG. 3. This board was found to be strong. No delamination was observed. The board had a thickness of 9 mm. The curing time was only about double that of plywood samples made with formaldehyde-based benchmark glue, and the dry resin loading was similar.

It is proposed that the curing time would be significantly reduced by mixing the binder with additives such as PAE, or by applying a version of the binder 1" with higher solid content to reduce the amount of water that needs to be removed to cure the binder.

Thus, binders of the present disclosure, such as binder B, have the potential to be employed to produce plywood products, or other similar products such as cross-laminated timber. The binders may be used in either their initial wet form or their rehydrated form.

Example 21: Use of Dry Binder Coating for Two-Step Surface Lamination

A laminate product was prepared. In a first step, Binder B of Example 8 of WO 2018/215742 A1 was applied and spread onto the bottom surface of industry standard foil lamination paper (also known as decorative finish foil paper). The binder was then dried, either by putting it near to a heat source at 150-200° C. for a few minutes, or by leaving it at room temperature for a few hours. The paper was not pressed. This provided a precursor product with a dry binder coating. In a second step, the paper with the coating layer of dry binder was then placed on top of a particleboard, such that the coating of dry binder contacted the particleboard, and the layers were pressed for 5 seconds at around 2 MPa. This acted to cure the binder coating and adhere the paper to the particleboard, forming a laminate.

The quality of the resulting lamination was excellent and knife tests showed excellent adhesion performance.

Therefore a precursor product can be formed that has the dry binder precursor provided on its surface, as a coating, and advantageously this precursor product can be directly adhered to another product by a process only requiring heat and/or pressure. There is no need for solvent to be added to rehydrate the binder coating.

It is hypothesized that moisture within the wood and/or the paper is sufficient to create conditions for the adhesive to adhere to the substrate and harden. This is supported by Example 7 above which showed that strong particleboards can be produced by mixing the binder in its powder form directly with wood chips without any solvent. The conclusion from the present example is similar, in the sense that a longer pressing time was required compared to when wet or rehydrated binder is used, but a composite product could nonetheless be made successfully from the dry form of the binder.

Example 22: Binder Dehydrated Together with Filler Material 100 g of wood chips (left at room temperature, moisture above 5%) were mixed with 20 g (wet) Binder B of Example 8 of WO 2018/215742 A1. The wood chips-binder mix was then placed into a dehydrator (Aicok automatic dehydrator, model number ASINPO30KVIN19822, 240 W, available from Amazon UK) and dried for 1 hour.

The dried mixture of wood chips-binder was then mixed with 2 g of PAE using an electric mixer with orbiter. The mixture was used to make a lab-scale particleboard as described in Example 19 above. The particleboard was pressed for 180 seconds at 0.5-2 MPa and 200° C.

This successfully formed a particleboard. No delamination occurred, despite the short pressing time and the low density (450 kg/m$^3$) of the final board.

This supports the conclusions of Example 7 and 12 above which showed that good products can be made from the binder in its dehydrated form, without needing any solvent to be present immediately before hot pressing. This can be useful, e.g., in reducing the amount of water in the system to reduce curing time.

This example also illustrates how the dehydration step can occur jointly with drying of the filler material. The dry wood chips-binder mix may be easier to transport and/or store.

Example 23: Re-Use of Binder Previously Dried Under Heat and Pressure

In a first step, Binder B of Example 8 of WO 2018/215742 A1 was applied and spread as a thin layer between two thin sheets of baking paper. This layer of binder, sandwiched between the two baking paper sheets, was then placed into a heat press and pressed at 200° C. and around 2 MPa for 20 seconds.

The baking paper sheets were then removed and the binder, which formed a cured and hardened layer, was extracted. This hardened binder layer was ground and made into a powder. The powder was then rehydrated to obtain a binder with a solids content of 40%.

This rehydrated binder was used to prepare a laminate product, as follows: A thin layer of the wet binder (without additive) was applied and spread onto the surface of a particleboard. A foil lamination paper was then placed on top, and the particleboard with the paper on its surface was placed into a hot press and pressed at 2 MPa at 200° C. for 5 seconds.

There was a relatively good adhesion between the paper and the board surface.

This illustrates how the binder can be rehydrated and used even after having been cured under heat and pressure. It is surprising that the binder can be used after having been cured. Formaldehyde-based glue, once cured, cannot be re-used.

Example 24: Re-Use of Binder Previously Used to Make Engineered Wood Product First, a particleboard was made with Binder B of Example 8 of WO 2018/215742 A1. The particleboard was made using the same techniques as described in Example 19 above. An amount of 95 g of dried woodchips was mixed with 20 g of wet binder B in an electrical orbiter. A mat was formed and was hot pressed at 0.5-2 MPa at 200° C. for 240 seconds to make a particleboard. The board was allowed to set out for 15 minutes at room temperature.

Then, the board was broken up into a plurality of pieces. Firstly it was broken in half, and then halved again, and then it was further shredded to break the board up into smaller wood chips.

These wood chips were then tested to determine whether the dried and cured binder B on/in the wood chips could act as a binder precursor.

A 100 g sample of these wood chips was placed into the electrical orbiter and was mixed with 6.5 g of water and 2 g of PAE.

A mat was formed from the mixture and this was hot pressed at 0.5-2 MPa at 200° C. for 300 seconds to make a particleboard.

The resulting particleboard was strong. Its density was around 700 kg/m$^3$ and its modulus of rupture, tested as in Example 19, was 5.0 MPa.

This illustrates how the binder can be rehydrated and used even after having been used in an engineered wood product formed by curing the binder under heat and pressure. It is surprising that the binder can be used after having been cured. Formaldehyde-based glue, once cured, cannot be re-used.

It is particularly surprising that a strong board can be made using recycled woodchips obtained from breaking down an engineered wood product without adding any further binder (only water and small quantities of PAE were added).

It is also particularly surprising that the binder is still effective after having been hot pressed to form the original particleboard and can be re-used to make a new particleboard.

Examples 16-24: Conclusion

The binders of the present disclosure can be dehydrated to form a powder and subsequently rehydrated to form a useful binder. The examples show that there is no significant loss of strength between the original binder and the rehydrated binder. The binder precursors of the invention are more suitable for long-term storage and transport, and are effective.

It has been found that dried binder can be used directly, for example by mixing the dry powder with wood chips and hot pressing them to make particleboards.

In other instances, wet or rehydrated binder can be applied onto the surface of a substrate, e.g., by applying a thin layer of wet binder on plywood sheets, particleboard surface, paper surface, or the like, and then dried so that the substrate with the dried or semi-dried binder coated on (and/or impregnated therein, when the substrate is porous) can later be hot pressed to another substrate. Thus the binder may be provided as a dry binder coating.

The dried binder can also be formed as a dry mix of filler material and binder and this mix can then be hot pressed to make products such as particleboards.

The dried binder can also be formed by being cured under heat and pressure. This cured binder can then be rehydrated and used, e.g., to prepare a laminate product.

Surprisingly, the dried binder can be formed from an engineered wood product that was made using binder as disclosed in WO 2018/215742 A1. Such an engineered wood product includes wood plus cured binder, and it has been determined that the engineered wood product can be recycled by breaking it down into pieces and then using these pieces to form a new product. These pieces have the cured (dry) binder, which can be considered a binder precursor, on their surface and/or in pores or voids. These pieces are able to be used to make a shaped article, such as particleboard, without needing any additional binder.

The ability to produce high strength engineered wood products using wet, rehydrated or dry binder, depending on the industrial environment, makes the present invention versatile. The present invention can produce non-toxic, commercially desirable, engineered wood products.

The examples confirm that binders made from other fungi, such as mushrooms, or beta-glucan can be used as a binder. Yeast may be considered to be the most preferred starting material because it mixes well with the other ingredients, resulting in low viscosity of the final mixture as well as giving preferable adhesive characteristics.

It has also been shown that the substitution of water for a mixture of an organic solvent (such as acetone) and water in the binder may reduce the drying time required for a binder without compromising on the properties of the final material.

The examples show that binders of the present invention can be used in a wide variety of different applications in the wood industry such as particleboards (woodchip pressed boards), plywood boards and laminated boards. This illustrates that the present invention is commercially relevant for a wide range of product such as Medium Density Fiberboard (MDF), Oriented Strand Board (OSB) and Cross-Laminated Timber (CLT), and also applications where the substrate is not necessarily a wood-based material

What is claimed is:

1. A method for preparing a binder precursor, wherein the method comprises the steps of:
   i) mixing (A) fungi or glucan and (B) starch with an alkaline agent, in the presence of an aqueous solvent system, to form an alkaline composition;
   ii) mixing the alkaline composition with an acidic agent to form a mixture; and then
   iii) drying the mixture to contain 10 wt. % or less solvent but greater than 0 wt. % solvent, and forming a powder therefrom, so as to form a powdered binder precursor;
   or wherein the method comprises the steps of:
   i) mixing (A) fungi or glucan and (B) starch with an acidic agent in the presence of an aqueous solvent system to form an acidic composition;
   ii) mixing the acidic composition with an alkaline agent to form a mixture; and then
   iii) drying the mixture to contain 10 wt. % or less solvent but greater than 0 wt. % solvent, and forming a powder therefrom, so as to form a powdered binder precursor.

2. The method of claim 1, wherein the aqueous solvent system comprises water and an organic solvent.

3. The method of claim 2, wherein the organic solvent is selected from the group consisting of: acetone, butanone, methanol, ethanol, 1-propanol, 2-propanol, diethyl ether, methyl acetate, ethyl acetate, toluene, 1,4-dioxane, tetrahydrofuran, acetonitrile, and methylene chloride, and mixtures thereof.

4. The method of claim 3, wherein the organic solvent is selected from the group consisting of: acetone, butanone, methanol, ethanol, 1-propanol, 2-propanol, 1,4-dioxane, tetrahydrofuran, and acetonitrile, and mixtures thereof.

5. The method of claim 4, wherein the organic solvent is acetone or methanol or mixtures thereof.

6. The method of claim 1, wherein the aqueous solvent system comprises 10% or more water by volume.

7. The method of claim 1, wherein the (A) fungi or glucan and (B) starch and the aqueous solvent system is provided in the form of an aqueous mixture, the aqueous mixture having a solvent content of from 45 to 90 wt. %.

8. The method of claim 1, wherein the starch comprises dextrin or is dextrin.

9. The method of claim 1, wherein the method is for producing a shaped article, the method comprising:
   a) providing a binder precursor by carrying out the steps performed in claim 1, and then:
   b) forming a binder composition by mixing the binder precursor with filler material;
   c) shaping the binder composition into a three-dimensional shape; and
   d) curing the binder composition to form a shaped article having said three-dimensional shape,
   wherein step c) and step d) can be carried out simultaneously or separately, and
   wherein during one or both of step c) and step d) pressure is applied to the binder composition.

10. The method of claim 9, wherein, in step b) or c), the binder precursor is rehydrated by mixing the binder composition with water, wherein optionally the water is provided in the form of an aqueous solvent system comprising water and an organic solvent.

11. The method of claim 1, wherein the method is for adhering two component parts to produce a composite product, each component part having a contact surface, the method comprising:
   a) providing a binder precursor by carrying out the steps performed in claim 1, and then:
   b) applying the binder precursor to the contact surface of the first component part and/or the contact surface of the second component part;
   c) contacting the contact surface of the first component part with the contact surface of the second component part; and
   d) curing the binder precursor to provide a composite product.

12. The method of claim 11, wherein the curing is by applying heat and/or pressure.

13. The method of claim 1, wherein the method is for producing a shaped article which is an engineered wood product, the method comprising:
   a) providing a binder precursor by carrying out the steps performed in claim 1, and then:
   b) forming a three-dimensional shape by combining the binder precursor and a plurality of component parts, with there being three or more component parts in the form of layers, each comprising wood, and with layers of binder being provided between the layers of wood; and
   c) curing the three-dimensional shape under pressure to form a shaped article having said three-dimensional shape.

14. The method of claim 1, wherein the method is for making a rehydrated binder, the method comprising the steps of:
   i) providing a binder by carrying out the steps performed in claim 1, and then:
   ii) mixing the binder precursor with water so as to form a rehydrated binder, wherein optionally the water is provided in the form of an aqueous solvent system comprising water and an organic solvent.

15. The method of claim 14, wherein the method is for making a shaped article, the method comprising:
   a) providing a rehydrated binder by carrying out the steps performed in claim 14, and then:
   b) forming a binder composition by mixing the rehydrated binder with filler material;
   c) shaping the binder composition into a three-dimensional shape; and
   d) curing the binder composition to form a shaped article having said three-dimensional shape,
   wherein step c) and step d) can be carried out simultaneously or separately, and
   wherein during one or both of step c) and step d) pressure is applied to the binder composition.

16. The method of claim 9, wherein the filler material comprises wood and the shaped article is an engineered wood product.

17. The method of claim 14, wherein the method is for producing a shaped article which is an engineered wood product, the method comprising:
   a) providing a rehydrated binder by carrying out the steps performed in claim 15, and then:
   b) forming a three-dimensional shape by combining the rehydrated binder and a plurality of component parts, with there being three or more component parts in the form of layers, each comprising wood, and with layers of binder being provided between the layers of wood; and
   c) curing the three-dimensional shape under pressure to form a shaped article having said three-dimensional shape.

18. The method of claim 14, wherein the method is for adhering two component parts to produce a composite product, each component part having a contact surface, the method comprising:
   a) providing a rehydrated binder by carrying out the steps performed in claim 14, and then:
   b) applying the rehydrated binder to the contact surface of the first component part and/or the contact surface of the second component part;
   c) contacting the contact surface of the first component part with the contact surface of the second component part; and
   d) curing the rehydrated binder to provide the composite product.

19. The method of claim 18, wherein the curing is by applying heat and/or pressure.

20. The method of claim 14, wherein the method is for preparing a precursor to a composite product or a precursor to a shaped article, the method comprising:
   a) providing a rehydrated binder by carrying out the steps performed in claim 14, and then:
   b) applying the rehydrated binder to a surface of a first component part of the composite product or to a surface of filler material for the shaped article; and
   c) allowing the rehydrated binder to dry.

21. The method of claim 20, wherein the rehydrated binder or the mixture dries on the surface of the first component part or on the surface of the filler material for the shaped article, so as to form a coating on the surface.

22. The method of claim 20, wherein the first component part or the filler material is porous and the rehydrated binder or the mixture partly or fully penetrates pores that are connected to the surface of the first component part or the filler material, and dries in these pores, so as to form an impregnated first component part or an impregnated filler material.

23. The method of claim 20, wherein the method is for forming a composite product, the method comprising:
   a) providing a composite product precursor by carrying out the steps performed in claim 20, and then:
   b) contacting the surface of the first component part with a surface of a second component part of the composite product; and
   c) applying heat and/or pressure to cure the binder precursor and adhere the first component part of the composite product to the second component part of the composite product so as to provide the composite product.

24. The method of claim 20, wherein the method is for producing a shaped article, the method comprising:
   a) providing a shaped article precursor by carrying out the steps performed in claim 20; and then
   d) optionally mixing the shaped article precursor with a crosslinker;
   e) shaping the shaped article precursor into a three-dimensional shape; and
   f) curing the binder precursor, to form a shaped article having said three-dimensional shape,
wherein step c) and step d) can be carried out simultaneously or separately, and
wherein during one or both of step c) and step d) pressure is applied to the binder precursor.

* * * * *